(12) United States Patent
Liu

(10) Patent No.: US 10,142,088 B2
(45) Date of Patent: Nov. 27, 2018

(54) NETWORK CLOCK SKEW ESTIMATION AND CALIBRATION

(71) Applicant: University of North Dakota, Grand Forks, ND (US)

(72) Inventor: Jun Liu, Grand Forks, ND (US)

(73) Assignee: University of North Dakota, Grand Forks, ND (US)

( * ) Notice: Subject to any disclaimer, the term of this patent is extended or adjusted under 35 U.S.C. 154(b) by 205 days.

(21) Appl. No.: 15/109,035

(22) PCT Filed: Jan. 30, 2015

(86) PCT No.: PCT/US2015/013865
§ 371 (c)(1),
(2) Date: Jun. 29, 2016

(87) PCT Pub. No.: WO2015/116980
PCT Pub. Date: Aug. 6, 2015

(65) Prior Publication Data
US 2016/0330012 A1    Nov. 10, 2016

Related U.S. Application Data

(60) Provisional application No. 61/934,162, filed on Jan. 31, 2014.

(51) Int. Cl.
*H04L 7/00* (2006.01)
*H04L 29/06* (2006.01)
(Continued)

(52) U.S. Cl.
CPC .......... *H04L 7/0008* (2013.01); *H04J 3/0664* (2013.01); *H04L 43/028* (2013.01);
(Continued)

(58) Field of Classification Search
None
See application file for complete search history.

(56) References Cited

U.S. PATENT DOCUMENTS 5,917,356 A   6/1999  Casal et al.
5,987,576 A   11/1999 Johnson et al.
(Continued)

FOREIGN PATENT DOCUMENTS

CN    102412954 A   4/2012
EP      1785802 A1  5/2007
(Continued)

OTHER PUBLICATIONS

Lin Yu et al., "A Fuzzy-based Approach to Remove Clock Skew and Reset from One-way Delay Measurement," from IEEE Transactions on Neural Networks16.5, Sep. 19, 2005, pp. 1125-1135.*

(Continued)

*Primary Examiner* — Charles C Jiang
*Assistant Examiner* — Saad Khawar
(74) *Attorney, Agent, or Firm* — Kinney & Lange, P.A.

(57) ABSTRACT

A method for use with a packet communication network includes receiving a plurality of packets at a sink node, calculating a one-way sink packet inter-arrival time between a first packet and a second packet received by the sink node according to a local sink clock time, calculating a one-way source packet inter-arrival time between the first packet and the second packet received by the sink node according to a local source clock time encapsulated in the first and second packets, estimating a ratio of clock skew between the source node and the sink node as a function of the one-way sink packet inter-arrival time and the one-way source packet inter-arrival time, and performing a calibration action in the network as a function of the ratio of clock skew between nodes.

25 Claims, 13 Drawing Sheets

(51) Int. Cl.
*H04L 12/801* (2013.01)
*H04L 12/26* (2006.01)
*H04L 29/12* (2006.01)
*H04J 3/06* (2006.01)

(52) U.S. Cl.
CPC ............ *H04L 43/04* (2013.01); *H04L 43/087* (2013.01); *H04L 43/0858* (2013.01); *H04L 43/106* (2013.01); *H04L 47/29* (2013.01); *H04L 61/2592* (2013.01); *H04L 69/28* (2013.01); *H04L 43/0864* (2013.01)

(56) References Cited

U.S. PATENT DOCUMENTS

| | | | |
|---|---|---|---|
| 6,327,274 | B1 | 12/2001 | Ravikanth |
| 6,661,810 | B1 | 12/2003 | Skelly et al. |
| 7,023,884 | B2 | 4/2006 | Chuah et al. |
| 7,283,568 | B2 | 10/2007 | Robie, Jr. et al. |
| 7,639,716 | B2 | 12/2009 | Murphy et al. |
| 7,787,438 | B2 | 8/2010 | Dowse |
| 7,865,331 | B2 | 1/2011 | Dzung et al. |
| 8,068,443 | B2 | 11/2011 | Riley et al. |
| 8,700,943 | B2 | 4/2014 | Dixon et al. |
| 8,873,589 | B2 | 10/2014 | Aweya et al. |
| 2008/0151771 | A1* | 6/2008 | Dowse ................ H04L 43/0858 370/252 |
| 2009/0037758 | A1 | 2/2009 | Carlson et al. |
| 2010/0002683 | A1 | 1/2010 | Miljovic et al. |
| 2010/0135332 | A1* | 6/2010 | Siemens ............... H04J 3/0667 370/503 |
| 2012/0210199 | A1* | 8/2012 | Gale ................... G06F 11/1633 714/807 |
| 2013/0080817 | A1* | 3/2013 | Mihelic .................... G06F 1/12 713/401 |
| 2013/0223838 | A1* | 8/2013 | Horishita ............. H04B 10/071 398/13 |
| 2013/0262910 | A1 | 10/2013 | Nathan |
| 2014/0122742 | A1 | 5/2014 | Rojas-Caessa et al. |
| 2014/0143582 | A1* | 5/2014 | Kindred .................... G06F 1/12 713/400 |
| 2016/0105353 | A1* | 4/2016 | Cociglio ............ H04L 43/0829 370/252 |

FOREIGN PATENT DOCUMENTS

| | | |
|---|---|---|
| EP | 2627040 A1 | 8/2013 |
| JP | 2013121014 A | 6/2013 |
| WO | WO2005002100 A1 | 6/2005 |
| WO | WO2014037685 A1 | 3/2014 |

OTHER PUBLICATIONS

David L. Mills, "Precision Synchronization of Computer Network Clocks," from ACM Computer Communication Review, 1994, pp. 1-16.

Sue B. Moon et al., "Estimation and Removal of Clock Skew from Network Delay Measurements," IEEE, 1999, 8 pages.

Xuan Ya Cao et al., "Joint Estimation of Clock Skew and Offset in Pairwise Broadcast Synchronization Mechanism," from IEEE Transactions on Communications 61(6):2508-2521, 2013, pp. 1-15.

Chenda Liao et al., "Distributed Clock Skew and Offset Estimation from Relative Measurements in Mobile Networks with Markovian Switching Topology," from Automatica, 2013, pp. 3015-3022.

Enrique Mallada et al., "Skewless Network Clock Synchronization," 2013, 10 pages.

International Search Report and Written Opinion for Application Serial No. PCT/US2015/013865, dated Apr. 28, 2015, 11 pages.

\* cited by examiner

NETWORK CLOCK SKEW ESTIMATION AND CALIBRATION

BACKGROUND

The present invention relates generally to a system and method for estimating a relative clock skew and/or a relative clock offset in packet-based communication networks, which in turn can be used to estimate variable one-way communication delays, constant one-way communication delays, and/or perform a calibration action on local clocks usable in the network.

Well-synchronized clocks are needed in many distributed computing applications whenever a common time reference has to be agreed among multiple devices. These distributed applications are widely used in industrial process control, scientific data measurements, transaction processing, communication protocols, and many other application scenarios. Some example applications include the industrial grade distributed data acquisition systems based on the Real-Time Ethernet (RTE), the distributed database Google Spanner, and the medium access control and reduction of power consumption in wireless networks. Of course, numerous other implementations make synchronized clocks desirable. Whenever an action has to be accomplished by involving multiple entities that are not co-located in the same device, those entities have to share a common time reference for understanding semantics of a desired action. Moreover, even in applications where clock synchronization within a given network is not mandatory, improved clock synchronization promotes efficient and precise operation.

Rates of the oscillators of physical clocks usually differ from each other, and the rates also vary with environmental perturbations, like changes in temperature. Timestamps reported by a physical clock are typically inconsistent to a global reference of time. A non-zero relative clock skew results if two clocks are not running at the same frequency. The relative clock skew between two clocks is represented either as the difference or the ratio of the frequencies of the two clocks. The knowledge of the relative clock skew between two clocks is needed for unifying the local readings of time durations.

Existing methods have been developed to estimate the relative clock skew between two clocks. These estimation methods mostly try to express the reading of a time duration measured according to one clock as a linear function of the reading measured according to the other clock. Then, the relative clock skew is estimated from the coefficients of the linear function. There are at least two problems with these methods. First, these methods have a low efficiency on estimating the relative clock skew. A sufficiently large number of measurements on time durations have to be performed in order to derive the coefficients of the linear function. Second, these methods lack the ability of tracking the changes of the relative clock skews.

The clocks in a network are typically organized into a master-slaves hierarchy, and clock synchronization messages are communicated among nodes to synchronize all slave clocks with a master clock. The delay spent in carrying a master clocks time-stamp to a slave clock affects the accuracy of clock synchronization. This delay is often variable due to the network congestion on a one-way path from the master to the slave. A one-way delay (sometimes abbreviated as OWD) from a master to a slave is commonly approximated by halving a round-trip delay between the two nodes. Under asymmetric delays or asymmetric network congestion status on the round-trip path between the two nodes, the approximated one-way delay can differ significantly from the actual one-way delay. Even if the variation of the one-way delay is removed under well-controlled network congestion, the approximated one-way delay still cannot be used in place of the constant one-way delay under asymmetric network path delays. The unknown value of a constant one-way delay makes it impossible to find out the relative offset between two clocks. Hence, the ability to accurately estimate the variable and constant components of a one-way delay creates inherent limitations on the accuracy of synchronizing two clocks in a network.

Synchronization of clocks can involve removing clock skews and offsets among the clocks. Because the frequency of hardware clocks is sensitive to environmental temperature, the mismatched frequency among clocks results in clock skews. The difference of the readings of two clocks at the same universal reference time is called the relative clock offset, and is mainly caused by network latency. One solution for keeping a common time reference is to broadcast a reference time to all nodes in a distributed system. A Universal Coordinated Time (UTC) can be broadcast to nodes by equipping the nodes with Global Positioning System (GPS) receiver modules. A reference time can also be broadcast in a physical channel from a reference node to other nodes. The broadcasting based solution has limited applicability. The predominant solution is to synchronize the clocks in a distributed system by making use of the Network Time Protocol (NTP).

NTP synchronizes clocks in a hierarchical way by organizing clocks into a master clock and a set of slave clocks. A slave clock calibrates its clock reading with the master clock through communicating timing messages. A slave clock asks for the current time-stamp of the master clock by sending a timing request message to the master clock. The master clock responds to the slave clock with its current time-stamp in a response message. Upon receiving a time-stamp from the master clock, the slave clock should set its current clock reading as the sum of this time-stamp and the one-way delay (OWD) spent in delivering the response message from the master clock to itself. The unknown value of the OWD prevents the slave clock from accurately calibrating its clock with the master clock. The OWD from a master clock to a slave clock is commonly approximated by halving a round-trip time (RTT) between the two clocks. The accuracy of clock calibration under NTP depends on the stability and symmetry of OWDs on each of the uni-directional paths that make up the round trip.

A rich set of clock synchronization methods have been developed to cope with diverse requirements in different distributed application scenarios. These methods range from low-cost, low-precision solutions, to moderate-cost, improved-precision solutions, to expensive, high-precision solutions. The NTP is a low-cost, low-precision, purely software-based clock synchronization solution with the accuracy ranges from hundreds of microseconds to several milliseconds. NTP estimates the clock offsets between a local clock and a universal standard clock by halving the round-trip delays between the two clocks. IBM Coordinated Cluster Time (CCT) aims to balance between accuracy and cost by achieving a better accuracy than NTP without additional hardware. IEEE 1588 Precision Time Protocol (PTP) is a relatively expensive solution with a sub-microsecond or even nanosecond accuracy. IEEE 1588 PTP requires special hardware support and may not be fully compatible with legacy systems.

Methods for estimating the relative clock offsets mainly include the two-way message exchange schemes and the broadcast-based schemes. In the two-way message exchange schemes, a relative clock offset can be estimated through the maximum-likelihood estimator (MLE) or its variants based on the delay measurements of a large number of message exchanges between two nodes, under various assumptions on the delay models: exponential random delay model, symmetric and asymmetric exponential delay model, and Gaussian delay model. The broadcast-based schemes exploit the broadcast nature of the physical channel to synchronize a set of receivers with one another in wireless sensor networks, e.g., Pairwise Broadcast Synchronization (PBS) and Reference Broadcast Synchronization (RBS). A reference node is elected to synchronize all other nodes within a cluster. Because differences in radio propagation times can be neglected in wireless networks, a reference message arrives at the same instant at all receivers. Other nodes can calculate the relative clock offsets based on the time-stamp encapsulated in the broadcasted reference messages.

The per-hop one-way link delays have also been studied in closed environments. One-way link delays have been made by separately estimating the constant and the variable parts of the one-way delays. The constant one-way link delays are estimated based on one-way single-hop measurements based on standard Internet control message protocol (ICMP) of NTP probes. A large-scale delay measurement study has been performed to capture the router-to-router delays by making use of packet traces obtained from an operational tier-1 network in which the synchronized clocks are required to run on a pair of routers. The internal links delays in a tree-like network topology have been estimated by making the multicast packets to traverse common links along their end-to-end paths. This method requires clock synchronization at the measurement hosts via GPS.

The estimation of the one-way end-to-end delays has also been studied. The forward and reverse one-way delays have been estimated by removing the common one-way delays from the two sets of the round-trip delays measured at the source and the sink, respectively, of a transmission control protocol (TCP) connection. Because the accuracy of the estimation depends on the accurate estimate of an initial one-way delay, the estimation error is still similar to the accuracy of trip delay. The one-way end-to-end delays can also be estimated from cyclic-path delay measurements in the existence of unsynchronized clocks and asymmetric network delays. In this approach, delay measurements for multiple cyclic-paths going through a common node are measured at the common node. Because only one clock is involved, the delay measurements are immune to the relative clock offset. The basic idea of this approach is to express the cyclic-path delays in terms of one-way delay variables. If there were enough independent cyclic-path delay measurements, then the one-way delays could be explicitly solved from a system of independent cyclic-path delay measurements. Namely, the number of independent cyclic-path delay measurements has to be at least the same as the number of unknown one-way delays. This approach can only be applied in situations when the cyclic-paths can be arranged.

Thus, an alternative system and method of estimating clock skew in a packet-based communication network is desired, which utilizes a relatively minimal number of assumptions for the estimate, is immune to out-of-order packet transmission, requires a relatively small number of packet transmissions, is relatively accurate, does not depend on an ability to form cyclic-paths, and/or eliminates inaccuracies from round-trip network asymmetries. It is further desired to provide a system and method for estimating variable and constant one-way delays in the packet-based communication network based on the estimate of clock skew, and further for performing a calibration action using the estimate of clock skew (or another estimate that is based upon the estimate of clock skew). Further advantages and benefits of the present invention will be appreciated in view of the entirety of the present disclosure, including the accompanying figures.

SUMMARY

A method for use with a packet communication network according to one aspect of the present invention includes receiving a plurality of packets at a sink node that were sent from a source node, calculating a one-way sink packet inter-arrival time between a first packet and a second packet received by the sink node according to a local sink clock time, calculating a one-way source packet inter-arrival time between the first packet and the second packet received by the sink node according to a local source clock time as encapsulated in the first and second packets, estimating a ratio of clock skew between the source node and the sink node as a function of the one-way sink packet inter-arrival time and the one-way source packet inter-arrival time, and performing a calibration action in the network as a function of the ratio of clock skew between the source node and the sink node.

The present summary is provided only by way of example, and not limitation. Other aspects of the present disclosure will be appreciated in view of the entirety of the present disclosure, including the entire text, claims and accompanying figures.

Figure 1:
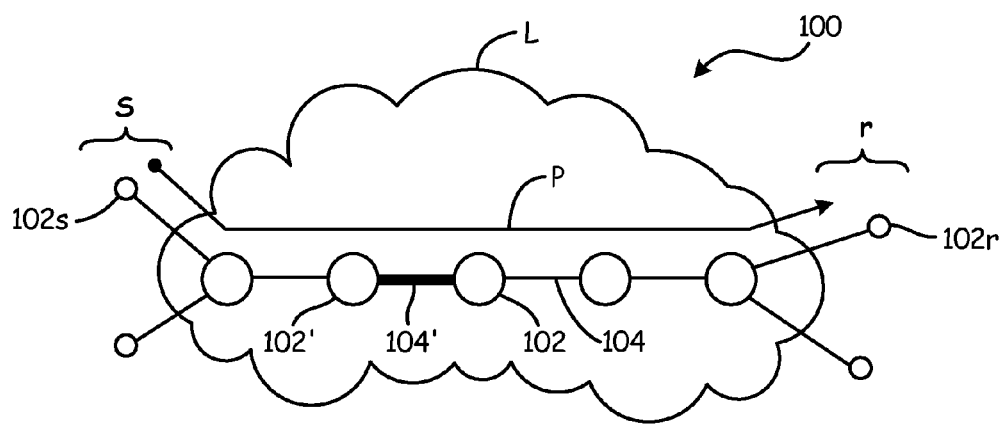
FIG. 1 is a schematic illustration of one embodiment of a packet-based communication network.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures depicting physical structures may not be drawn to scale, and applications and embodiments of the present invention may include features, steps and/or components not specifically shown in the drawings.

DETAILED DESCRIPTION

In general, the present disclosure describes a novel system and method for estimating clock skew and offset between a pair of nodes in a packet-based communication network. Such a clock skew estimate can in turn facilitate estimation of variable and constant components of one-way delays.

A method according to the present invention for estimating the relative clock skew can include sending a sequence of probing packet batches from a source node to a sink node along a fixed one-way path. Timestamps of sending and receiving the packets at the source node and the sink node are recorded with respect to the respective local clocks of the source and sink nodes. A ratio of packet inter-arrival times can be used to estimate relative clock frequencies and skew between the source and sink nodes, regardless of known or unknown clock offsets. A fuzzy filtering method can be used to iteratively update the estimate of clock skew on a per-packet basis, and can provide a confidence measure associated with the estimate of clock skew.

A method according to the present invention for estimating the variable and constant components of one-way delays between the source and sink nodes can be estimated based on carefully crafting a relationship between timestamps measured with respect to local clocks, as a function of the ratio of clock skew. Without knowledge of an actual offset of the local clocks at the source and the sink nodes, this estimation method can generally only estimate the constant delay component up to the offset value of the actual constant delay.

Parameters can be calculated to perform a calibration action in the network, such as to synchronize clocks for devices (e.g., the source and the sink nodes) in the network. For instance, calculated parameters can be exchanged between at least two nodes in the network (e.g., between the source and sink nodes, between the sink node and another node remote from the source node, etc.), and the associated clocks synchronized. Numerous other calibration actions, such as time service provisions, can be provided using a skew and/or offset estimate according to the present invention. The confidence measure from the fuzzy filtering method can be utilized to guide the calibration action. In view of the entirety of the present disclosure, including the accompanying figures, persons of ordinary skill in the art will recognize that a system and method according to the present invention provides numerous advantages and benefits.

This application claims priority to U.S. Provisional Patent Application Ser. No. 61/934,162, filed Jan. 31, 2014, which is hereby incorporated by reference in its entirety.

FIG. 1 is a schematic illustration of one embodiment of a packet-based communication network 100 that includes a plurality of nodes 102, each node representing a network communication capable device, and corresponding communication links 104 between adjacent nodes 102. Each network node 102 can be a device having substantially the same configuration throughout all or part of the network 100, or different nodes 102 can have dissimilar configurations. The links 104 can be any combination of wired and/or wireless links, including all-wired and all-wireless embodiments. Some or all of the links 104 can comprise connections over the Internet. In addition, or in the alternative, some or all of the links 104 can comprise local network connections.

The nodes 102 of the illustrated embodiment include a plurality of router nodes 102 in a cloud L, as well as a plurality of source nodes s and a plurality of sink nodes r. The nodes source nodes s include a source node 102s, and the sink nodes r include a sink node 102r. As used herein, the terms "source" and "sink" are designations of convenience used to refer to functional characteristics of a given node 102 at a given time, in terms of which node sends a packet stream (the source) and which node is the intended ultimate destination receiving the packet stream (the sink) along a given network path. In the illustrated embodiment, a one-way path P is shown schematically from the source node 102s to the sink node 102r. A given node 102 can act as a source node s at one time, and act as a sink node r at another time. Moreover, a given node 102 can participate in multiple networks concurrently, though only the network 100 is shown.

As shown in FIG. 1, a node 102' is a bottleneck node and a link 104' is a bottleneck link. Bottlenecks can be produced by variable queuing delays (e.g., bandwidth limits, transitory loss of link connectivity, etc.).

It should be understood that the particular topology and number of nodes 102 in the network 100 of FIG. 1 is provided merely by way of example and not limitation. Nearly any network topology is possible. For example, the network 100 can have any suitable configuration of the links 104 between the nodes 102, such as in a fixed or variable hierarchy, as a dynamically-variable mesh network (star, hub-and-spoke, etc.), etc. Moreover, the network 100 can include other components not specifically shown in FIG. 1. It is further noted that subsequent descriptions refer to the network 100, for the sake of convenience and to aid in understanding embodiments the invention, though methods of the present invention can be implemented on other networks having other configurations.

Figure 2:
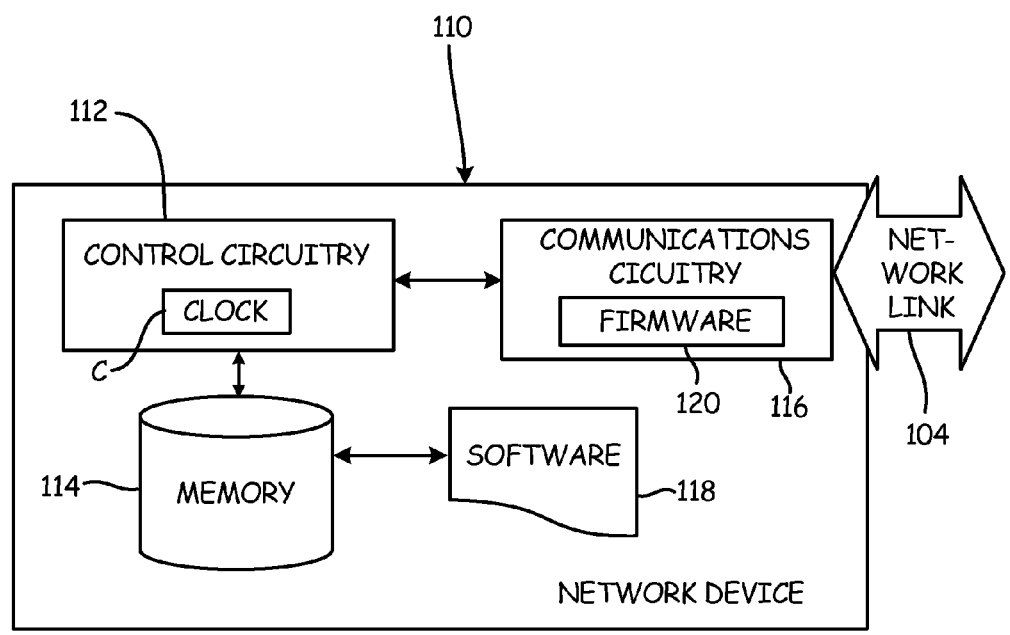
FIG. 2 is a schematic block diagram of an embodiment of a network device for use with the network of FIG. 1.

FIG. 2 is a schematic block diagram of an embodiment of a network device 110 (e.g., field-deployed device, router, computer, server, or the like) for use as any of the nodes 102 within the network 100. The device 110 can include control circuitry 112, memory 114 (e.g., non-volatile and/or volatile memory), and suitable communication circuitry 116 (e.g., transmit and/or receive circuitry, antennae, etc.) to transmit and/or receive communication signals over wired or wireless links between nodes. Suitable software 118 and firmware 120 can also be provided, executable by the control circuitry 112 and/or the communication circuitry 116. In the illustrated embodiment, the software 118 is stored in the memory 114, and the firmware 120 is incorporated into the communications circuitry 116. As shown in the illustrated embodiment, a clock C is implemented within the control circuitry 112, as hardware and/or software/firmware, though in further embodiments the clock could be external to the control circuitry 112. The control circuitry 112 can include one or more processors and/or other circuitry. In some embodiments, the control circuitry 112 can include at least one processor and one or more oscillators (external to the processor(s)) that work together, along with suitable software 118 (e.g., an operating system kernel), to implement the clock C Implementations of the clock C in a kernel and other alternate configurations are discussed further below with respect to FIG. 3. Persons of ordinary skill in the art will recognize that nearly any suitable configuration individual devices 110 can be used as any of the nodes 102 in the network 100. The device descriptions given above are provided merely by way of example, and not limitation. For instance, other components or features not specifically mentioned can be utilized by or within individual network devices 110.

Figure 3:
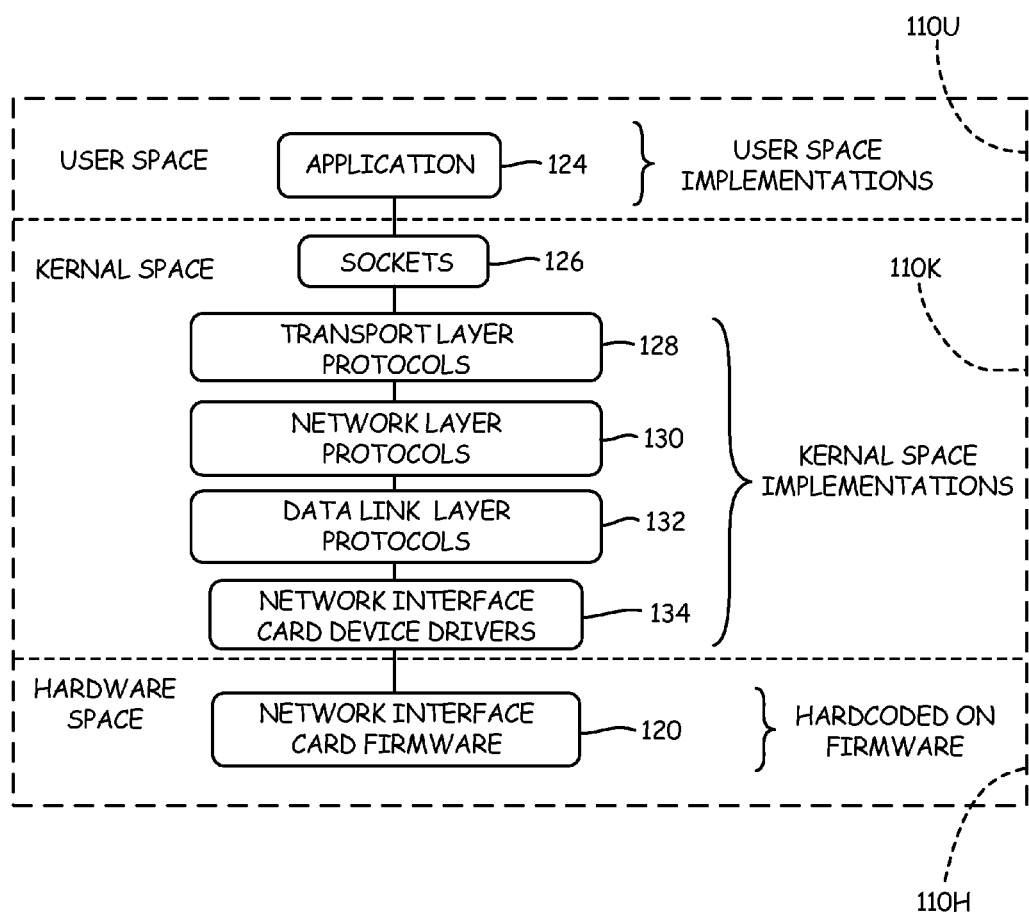
FIG. 3 is a schematic illustration of implementation spaces for the present invention.

FIG. 3 is a schematic illustration of possible implementation spaces for the present invention in the network device 110, within a user space 110U, a kernel space 11K and a hardware space 110H. In the user space 110U, the system and method of the present invention can be implemented in an application 124 (e.g., a software application). In the kernel space 110K, the present invention can be implemented in sockets 126, transport layer protocols 128, network layer protocols 130, data link layer protocols 134, or network interface card drivers 134. In the hardware space 110H, the system and method can be implemented on firmware 120 of a network interface card (i.e., communications circuitry 116). In various embodiments, the system and method of the present invention can be implemented on any of the enumerated locations, or across multiple such locations. Other implementation locations not specifically mentioned are also possible.

The Clock Model and One-Way Delays

The Clock Model

For a data stream (e.g., along the path P) running in the network 100, time measurements can be performed at the source 102s and the sink 102r nodes according to the respective local clocks C. Three clocks can be considered for a given data stream: a universal standard clock $C_u$, a local clock used on the source side $C_s$, and a local clock used on the sink side $C_r$. The universal standard clock reports the "true" time and can be used as a standard time reference. Both the source and sink clocks $C_s$ and $C_r$ are assumed to be initially unsynchronized to the universal standard clock $C_u$. The two clocks $C_s$ and $C_r$ are also assumed unsynchronized to each other. Timestamps with respect to the clocks $C_u$, $C_s$, and $C_r$ are symbolized by u, t, and T, respectively. It should be appreciated that the timestamps t, and T can be directly implemented in packets that carry data for regular communication (i.e., carry data not related to network operation) or implemented by using a separate protocol (e.g., in a protocol dedicated to delay testing and measurement, without regular data transfer) so that the same measurement can be performed. Accordingly, a measurement scheme of the present invention can be integrated into a real-time application or can be used in conjunction with new protocols specifically designed to measure the performance of packet networks such as of the Internet.

Rates of oscillators of physical clocks usually differ from each other, and the rates also vary with the environmental perturbations, like changes in temperature. The time values reported by a given physical clock are typically inconsistent to a global reference of time.

Figure 4:
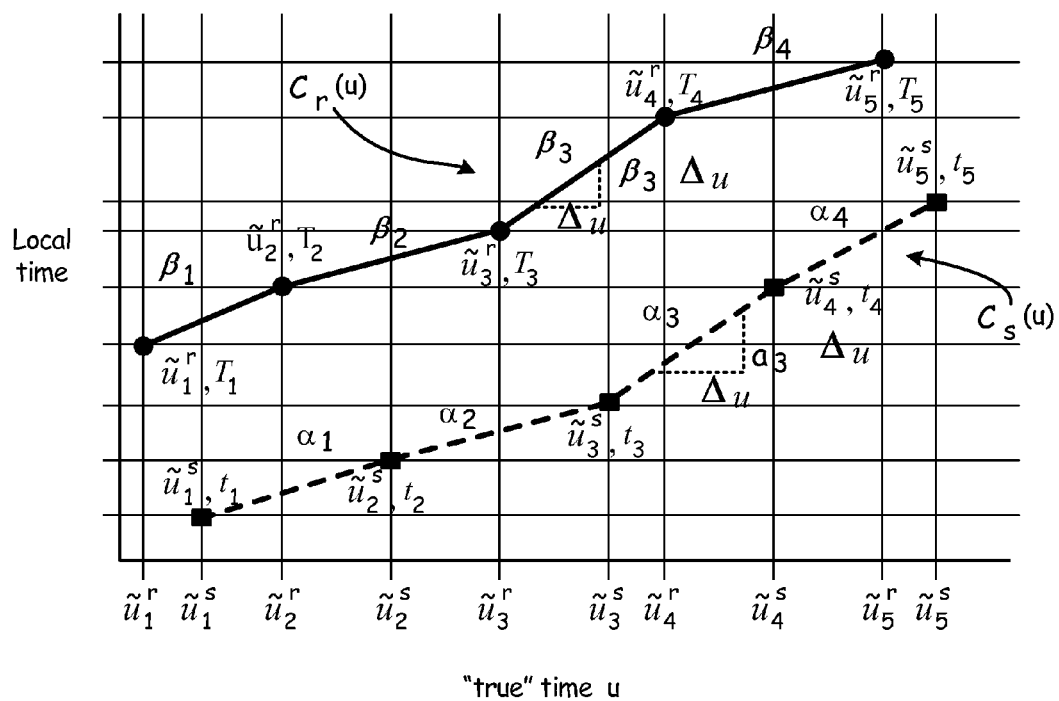
FIG. 4 is a graph schematically illustrating piecewise linear functions for modeling local clocks, plotting local clock time vs. "true" time u for a pair of network nodes.

FIG. 4 is a graph schematically illustrating example piecewise linear functions $C_s(u)$ and $C_r(u)$ for modeling local clocks of the source node 102s and the sink node 102r, respectively. Local clock timestamps t and T are plotted on the dimensionless vertical axis and "true" time u is plotted on the horizontal axis. The example piecewise linear functions $C_s(u)$ and $C_r(u)$ of FIG. 4 are shown merely for illustrative purposes, and the contours of a piecewise linear function for any given clock operating within any given network will vary from the illustrated examples.

A given physical clock (e.g., $C_s$ and $C_r$) is characterized in the graph of FIG. 4 as a piecewise continuous function that is twice differentiable except on a finite set of points: $C: R \rightarrow R$. The timestamp with respect to the universal standard clock is symbolized by u. The progresses of clocks $C_s$ and $C_r$ are characterized by the piecewise functions $C_s(u)$ and $C_r(u)$, respectively. Clock characteristics include the following factors:

Offset: the difference between the readings of two clocks. The offset between clocks $C_s$ and $C_r$ at a universal timestamp u is $(C_r(u)-C_s(u))$.

Frequency: the clock rate. The frequencies ($\beta$) of clocks $C_s$ and $C_r$ are $$\beta_s(u) = \frac{d}{du}C_s(u) \text{ and } \beta_r(u) = \frac{d}{du}C_r(u)$$

respectively.

Skew: the difference in the frequencies of a clock and the universal standard clock. The skew of clock $C_s$ relative to clock $C_r$ is $$\left(\frac{d}{du}C_s(u) - \frac{d}{du}C_r(u)\right).$$

Drift: the second derivative of the piecewise continuous function. The drifts of clocks $C_s$ and $C_r$ are $$\frac{d^2}{du^2}C_s(u)$$

and $$\frac{d^2}{du^2}C_r(u),$$

respectively. The drift of clock $C_s$ relative to clock $C_r$ is $$\left(\frac{d^2}{du^2}C_s(u) - \frac{d^2}{du^2}C_r(u)\right).$$

Two clocks are said to be: skewing clocks if they have a non-zero relative skew; offsetting clocks if they have a zero relative skew and a non-zero relative offset; and synchronized clocks if they have a zero relative skew and a zero relative offset.

The set of non-differentiable points on the timeline of clock $C_s$ is denoted by $$\{C_s(\tilde{u}_0^s), C_s(\tilde{u}_1^s), C_s(\tilde{u}_2^s), \ldots\}$$

The clock frequency stays constant for $u \in [\tilde{u}_j^s, \tilde{u}_{j+1}^s)$ ($j \geq 0$), and this constant value is denoted by $\beta_s(\tilde{u}_j^s)$. Similarly, the set $\{C_r(\tilde{u}_0^r), C_r(\tilde{u}_1^r), C_r(\tilde{u}_2^r), \ldots\}$ is defined for the clock $C_r$. The clock frequency $$\beta_r(u) = \frac{d}{du} C_r(u)$$

stays constant for $u \in [\tilde{u}_j^r, \tilde{u}_{j+1}^r)$ ($j \geq 0$). This constant value is denoted by $\beta_r(\tilde{u}_j^r)$. The piecewise functions $C_s(u)$ and $C_r(u)$ are defined as (see FIG. 4):

$C_s(u) = \beta_s(\tilde{u}_j^s) \cdot (u - \tilde{u}_j^s) + C_s(\tilde{u}_j^s)$ for $u \in [\tilde{u}_j^s, \tilde{u}_{j+1}^s)$, $C_r(u) = \beta_r(\tilde{u}_j^r) \cdot (u - \tilde{u}_j^r) + C_r(\tilde{u}_j^r)$ for $u \in [\tilde{u}_j^r, \tilde{u}_{j+1}^r)$.

Two functions $\tilde{u}_s$ and $\tilde{u}_r$ are defined to identify the starting point of a linear segment in which a send or receive time is included.

$\tilde{u}_j^s = \tilde{u}_s(u)$ if $u \in [\tilde{u}_j^s, \tilde{u}_{j+1}^s)$ and $\beta_s(u) = \beta_s(\tilde{u}_j^s)$;

$\tilde{u}_j^r = \tilde{u}_r(u)$ if $u \in [\tilde{u}_j^r, \tilde{u}_{j+1}^r)$ and $\beta_r(u) = \beta_r(\tilde{u}_j^r)$.

The One-Way Delays

Network delay is an important network performance metric which strongly affects the performance of network routing, flow control, and network media streaming services, such as the real-time audio and video streaming services. In many applications, delay monitoring has to be performed on a regular basis in order to verify the compliance to delay constraints. A one-way delay ($w_k$) measure is more useful than a round-trip delay for applications whose performance is dependent on one-way delays, e.g., file transfer protocol (FTP) and Video on Demand (VoD). Estimation of one-way delay between a pair of sender and receiver nodes (e.g., between nodes 102s and 102r along the path P) is an important issue in computer networks. Monitoring the one-way delays is especially necessary for the time-sensitive media streaming. When the function of an application relies on the live feed of a data stream, the quality-of-service (QoS) received by the application running at the sink node 102r of the data stream is sensitive to the one-way delays from the source node 102s to the sink node 102r of the data stream. A one-way delay from a source 102s to a sink 102r is the time duration between when a probing packet is sent at the source 102s and when it is received at the sink 102r. A one-way delay consists of a constant delay component and a variable delay component.

The one-way delay experienced by a packet along a one-way path (P) includes a cumulative propagation delay ($\tau$), a cumulative transmission delay (g), a cumulative processing delay ($f_k$), and a cumulative queueing delay ($q_k$). When the packets are the same size, they share the same cumulative transmission delay. However, the cumulative processing delay and the cumulative queueing delay can vary for different packets. The one-way delay ($w_k$) can be expressed as a sum of a constant delay component (c) and a variable delay component ($v_k$). The value of a constant delay component can be treated as a sum of the cumulative propagation delay ($\tau$), the cumulative transmission delay (g), and a minimum cumulative processing delay ($f^{min}$), along a one-way path (P). The value of a variable delay component ($v_k$) can be treated as a sum of the cumulative queueing delay ($q_k$) and an excess amount of the cumulative processing delay ($f_k$) beyond the minimum cumulative processing delay ($f^{min}$). The timestamps of sending and receiving the k-th packet at the source and at the sink according to the local clocks are shorthanded by $t_k^s = C_s(u_k^s)$ and $T_k^r = C_r(u_k^r)$, respectively. The constant delay component (c), the variable delay component ($v_k$), and the one-way delay for the k-th packet ($w_k$) are expressed as:

$c = \tau + g + f^{min}$, $v_k = q_k + (f_k - f^{min})$ $w_k = c + v_k$.

Here it is noted that the reference character c (lowercase) for the constant delay component should not be confused with the reference character C (uppercase) for the clocks. Under the assumption that both local clocks $C_s$ and $C_r$ run at the same frequency ($\beta$) as the universal standard clock $C_u$, we further have that $w_k = u_k^r - u_k^s = t_k^r - t_k^s = T_k^r - T_k^s$.

Accurate estimations of the one-way variable delays can be used to aid a sender (i.e., a source node) to adjust its sending rate in transmission control protocol (TCP) because the queuing delays have been commonly used to infer the congestion along the path (P). Thus, the method of estimating the constant and variable components of one-way delays is useful for a sender (source) to understand congestion status of a one-way path (P).

Measuring the one-way delays is simple when the clocks used at a pair of source and sink nodes 102s and 102r are perfectly synchronized. However, this simple measurement method can not be applied to the cases when offsetting clocks (with a constant difference between the readings on the two clocks) or drifting clocks (with unknown drifting rates) are used at the pair of source and sink nodes 102s and 102r.

Figure 5:
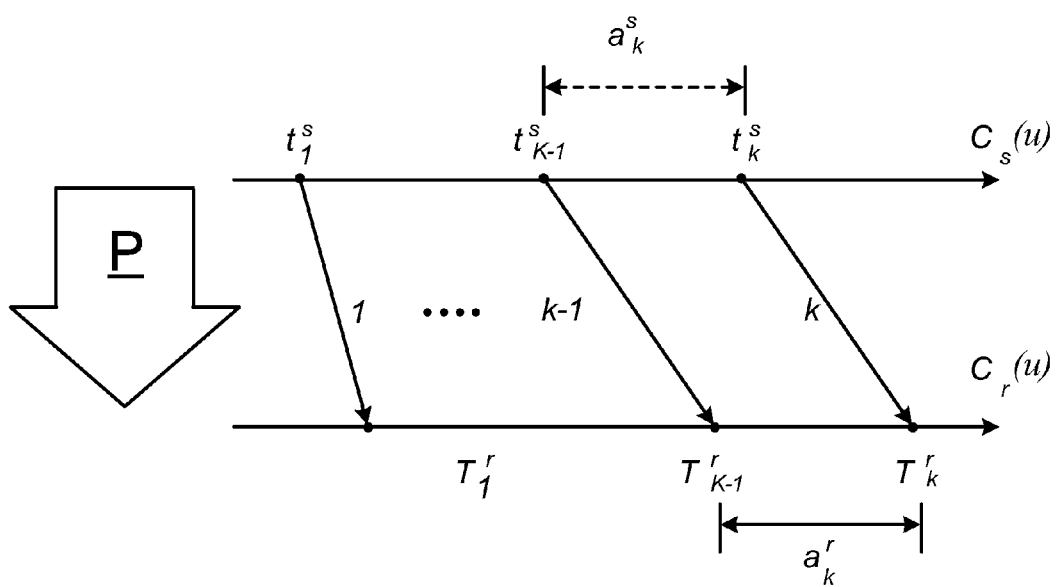
FIG. 5 is a schematic illustration of a packet stream sent along a one-way path between network nodes.

FIG. 5 is a schematic illustration of a packet stream including packets 1 to k send along one-way path P between source node 102s (represented by the piecewise linear function $C_s(u)$) and the sink node 102r (represented by the piecewise linear function $C_r(u)$), including packet one-way delays. A packet inter-arrival time $a_k^r$ is an inter-arrival time between the k-th and (k−1)-th packets measured by the local clock $C_r$ of the sink node 102r, and a packet inter-arrival time $a_k^s$ is an inter-arrival time between the k-th and (k−1)-th packets measured by the local clock $C_s$ of the source node 102s. A time $t_k^s$ is a local time at the source node 102s when the source node 102s starts to send the k-th packet. A time $T_k^r$ is a local time at the sink node 102r when the sink node 102r fully receives the k-th packet. In this respect, the packet inter-arrival time $a_k^s$ is not strictly an "arrival" time, but rather relates to the inter-departure times between packets sent by the source node; however, it has been discovered that treating the inter-departure sending times as a proxy for inter-arrival times provides an efficient and reliable way to calculate a ratio of relative clock frequencies indicative of skew. As will be understood from the description that follows, use of fuzzy filtering and a confidence measure helps to compensate for imprecisions generated by use of this inter-departure proxy for inter-arrival times measured by the source clock $C_s$, which may arise at transitions between different linear regions of the piecewise linear function $C_s(u)$.

Even though two clocks can be made synchronized by adopting the clock synchronization procedures, many such procedures have limitations to their application. For example, Global Positioning Systems (GPS) can accurately synchronize the clocks used at multiple network nodes. However, GPS-based synchronization requires GPS hardware implemented at relevant network nodes, and GPS devices have not been densely deployed in computer networks, nor can GPS devices be deployed indoors (due to lack of reception of satellite signals) or at secured nodes. The Network Time Protocol (NTP) is the standard for synchronizing clocks in the Internet. NTP measures round-trip delays and uses a halving procedure to estimate the clock offsets. The NTP based clock synchronization procedures achieve a good accuracy for symmetric delays. The symmetric delays are only made possible when the probing packets take the same round-trip route with the same traffic loads and QoS configurations in both directions. When the forward and backward one-way delays along a round-trip route are different, the one-way delays cannot be accurately estimated by halving the round-trip delays. The asymmetric forward and backward one-way delays are caused by two factors: the asymmetric round-trip routes in the current network (e.g., Internet), and the asymmetric queuing delays on the two one-way paths even when a round-trip route is symmetric.

As detailed further below, the present invention provides an alternative system and method of determining the one-way variable delays along the network path P from the source node $102s$ to the sink node $102r$, the relative clock skew, and/or the relative clock offset between the first clock $C_s$ used at the source node $102s$ and a second clock $C_r$ used at the sink node $102r$ in the network $100$. The present invention overcomes limitations found in prior art delay measurement systems and methods, and provides numerous other advantages and benefits.

Estimation of the Ratio of Clock Frequencies

Knowledge of a ratio of clock frequencies ($\varphi$) can be used for estimating the one-way variable delays (v), as well as other values. Local time measurements t and T can be recorded on a per-packet basis according to the local clocks $C_s$ and $C_r$ whose timelines are modeled by piecewise linear functions $C_s(u)$ and $C_r(u)$ as shown in FIG. 4. The timestamps of sending and receiving the k-th packet at the source node $102s$ and at the sink node $102r$ according to the respective local clocks $C_s$ and $C_r$ are shorthanded by $t_k^s = C_s(u_k^s)$ and $T_k^r = C_r(u_k^r)$, respectively, and the corresponding "true" time values $u_k^s$ and $u_k^r$ can be given as:

$$u_k^s = \frac{t_k^s}{\beta_s(\tilde{u}_s(u_k^s))} - \frac{C_s(\tilde{u}_s(u_k^s))}{\beta_s(\tilde{u}_s(u_k^s))} + \tilde{u}_s(u_k^s),$$

$$u_k^r = \frac{T_k^r}{\beta_r(\tilde{u}_r(u_k^r))} - \frac{C_r(\tilde{u}_r(u_k^r))}{\beta_r(\tilde{u}_r(u_k^r))} + \tilde{u}_r(u_k^r).$$

The one-way delay (OWD) experienced by the k-th packet is expressed according to the "true" time as $w_k = u_k^r - u_k^s$. The difference between $w_k$ and $w_{k-1}$ is expressed as $$w_k - w_{k-1} = (u_k^r - u_k^s) - (u_{k-1}^r - u_{k-1}^s) = (u_k^r - u_{k-1}^r) - (u_k^s - u_{k-1}^s).$$

Inter-arrival durations (a) between two adjacent packets measured according to the local clocks $C_s$ and $C_r$ at the source $102s$ and at the sink $102r$ are expressed, respectively, as $$a_k^s = t_k^s - t_{k-1}^s \text{ and } a_k^r = T_k^r - T_{k-1}^r.$$

To simplify the analysis, it is assumed that the local timestamps of two consecutive packets belong to the same linear region of the piecewise linear function $C_s(u)$ or $C_r(u)$. Hence, we have that $$a_k^s = \beta_s(\tilde{u}_s(u_k^s)) \cdot (u_k^s - u_{k-1}^s),$$

$$a_k^r = \beta_r(\tilde{u}_r(u_k^r)) \cdot (u_k^r - u_{k-1}^r).$$

The above expressions are only inaccurate when the timestamps of the (k−1)-th and the k-th packets belong to two adjacent linear regions. Combining these equations, we have that $$w_k = w_{k-1} + \frac{a_k^r}{\beta_r(\tilde{u}_r(u_k^r))} - \frac{a_k^s}{\beta_s(\tilde{u}_s(u_k^s))}.$$

After removing the constant delay component from both sides of the above equation, we also have that $$v_k = v_{k-1} + \frac{a_k^r}{\beta_r(\tilde{u}_r(u_k^r))} - \frac{a_k^s}{\beta_s(\tilde{u}_s(u_k^s))}.$$

Reorganizing the above recursion, we further have that $$\beta_r(\tilde{u}_r(u_k^r)) \cdot v_k = \beta_r(\tilde{u}_r(u_k^r)) \cdot v_{k-1} + a_k^r - \frac{\beta_r(\tilde{u}_r(u_k^r))}{\beta_s(\tilde{u}_s(u_k^s))} \cdot a_k^s.$$

$\beta_r(\tilde{u}_r(u_k^r)) \cdot v_k$ denotes the one-way variable delay experienced by the k-th packet measured according to the sink-side local clock $C_r$. The ratio of the clock frequencies ($\varphi$) of the two clocks $C_s$ and $C_r$ at "true" time $u_k^r$ is denoted by $$\phi(u_k^r) = \frac{\beta_r(\tilde{u}_r(u_k^r))}{\beta_s(\tilde{u}_s(u_k^s))}$$

An estimator to the ratio of clock frequencies is defined as $$\theta_k = \frac{a_k^r}{a_k^s}.$$

The value of $\theta_k$ can be directly calculated from the local time measurements t and T. The estimator is expressed as $$\theta_k = \beta_r(\tilde{u}_r(u_k^r)) \cdot \frac{v_k - v_{k-1}}{a_k^s} + \phi(u_k^r).$$

Hence, $$\begin{cases} \theta_k > \phi(u_k^r), & \text{when } v_k > v_{k-1}, \\ \theta_k = \phi(u_k^r), & \text{when } v_k = v_{k-1}, \\ \theta_k < \phi(u_k^r), & \text{when } v_k < v_{k-1}. \end{cases}$$

The ratio of clock frequencies ($\varphi$) can be estimated by $\theta_k$ when the condition $v_k = v_{k-1}$ is satisfied. The present invention includes a method of inferring satisfaction to the condition of $v_k = v_{k-1}$ by examining a difference between $\phi_k$ and $\phi_{k+1}$ When assuming that $\beta_r(\tilde{u}_r(u_k^r)) = \beta_r(\tilde{u}_r(u_{k-1}^r))$, then $$\theta_k - \theta_{k-1} = [\phi(u_k^r) - \phi(u_{k-1}^r)] + \beta_r(\tilde{u}_r(u_k^r)) \cdot \left( \frac{v_k - v_{k-1}}{a_k^s} - \frac{v_{k-1} - v_{k-2}}{a_{k-1}^s} \right).$$

When $\theta_k \approx \theta_{k-1}$, it is likely that the values of $v_{k-2}$, $v_{k-1}$, and $v_k$ are close to each other. Furthermore, the similar values of $v_{k-2}$, $v_{k-1}$, and $v_k$ lead to $\phi(u_k^r) \approx \phi(u_{k-1}^r)$. The common cases for $v_{k-2}$, $v_{k-1}$, and $v_k$ to have similar values are that these values are all 0. Thus, the case of $\theta_k \approx \theta_{k-1}$ is the likely indication that $v_{k-2}$, $v_{k-1}$, and $v_k$ are all 0. Meanwhile, it is still possible that $v_{k-2}$, $v_{k-1}$, and $v_k$ have non-zero values when $\theta_k \approx \theta_{k-1}$. In order to filter out the cases that $v_{k-2}$, $v_{k-1}$, and $v_k$ have non-zero values when $\theta_k \approx \theta_{k-1}$, the present invention includes a fuzzy filtering method to identify the suitable samples of $\theta_k$ which will lead to accurate estimation of $\phi(u_k^r)$.

Figure 6:
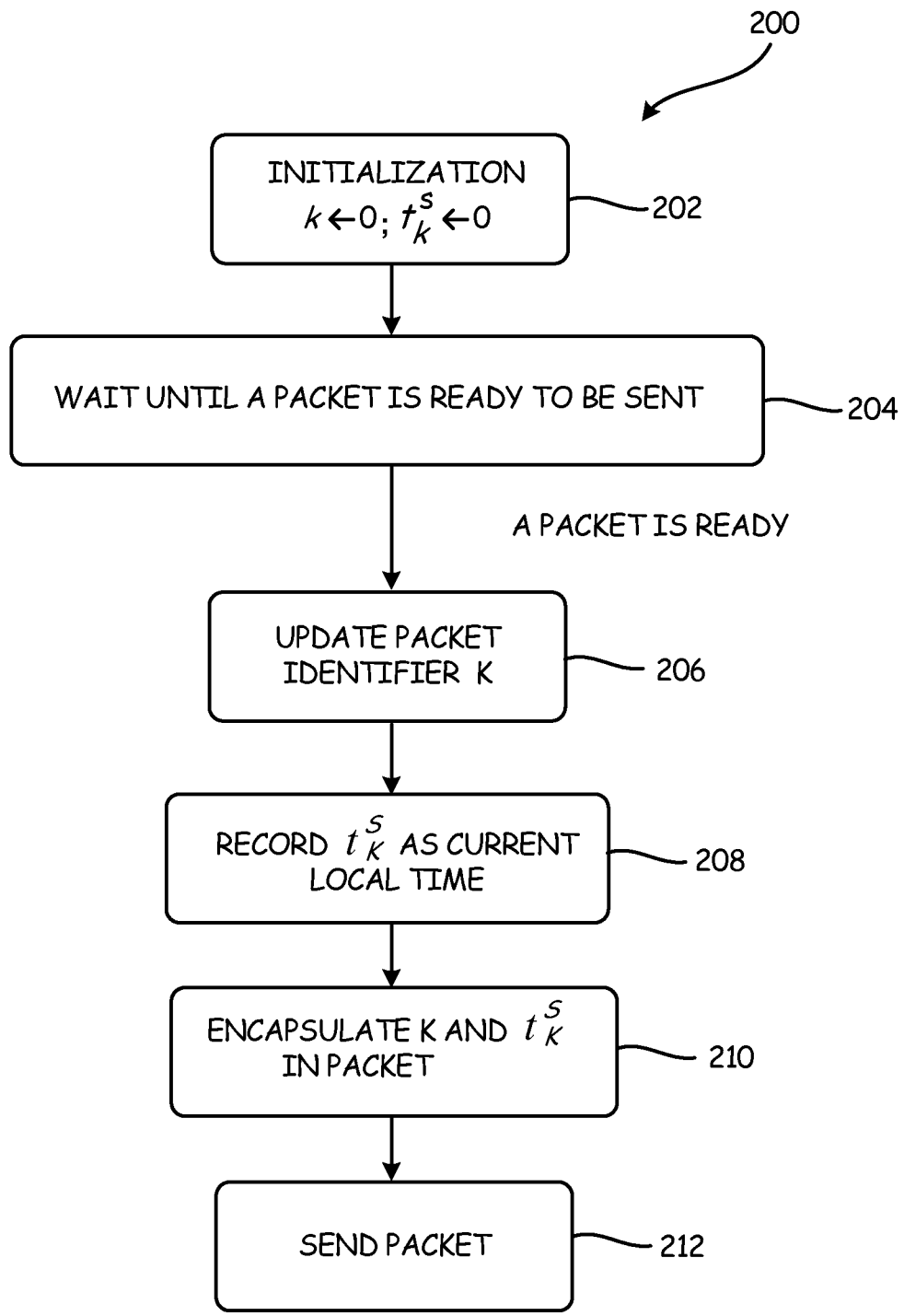
FIG. 6 is a flow chart illustrating an embodiment of a method for source-side packet handling according to the present invention.

FIG. 6 is a flow chart illustrating an embodiment of a method 200 for source-side packet handling. In a first step, an initialization procedure is performed for a given packet stream sent along the one-way path P between the source node 102s and the sink node 102r in the network 100 (Step 202). Initialization can include setting initial values (e.g., zero) of selected data values, such as $k \leftarrow 0$ and $t_k^s \leftarrow 0$. Initialization can further include an identification of the path P for which an estimate or calibration action is desired. After initialization, the source node 102s then waits until a packet is ready to be sent (Step 204). If the method 200 is utilized in a real-time application, then a given packet may be ready to be sent when data (ie., data not related to network operation) is ready for transmission. Alternatively, when the method 200 is utilized protocols specifically designed to measure the performance of packet networks such as of the Internet, a given packet may be ready for transmission when a calibration action is desired, such as a calibration action that utilizes a current estimate of one-way delays or a current ratio of relative clock frequencies. It will be recognized that the particular parameters to decide when a packet is ready to be sent can vary as desired for particular applications. Once a packet is ready to be sent, a packet identifier k is updated: $k \leftarrow k+1$ (Step 206), the current local time according to the clock $C_s$ of the source node 102s for the k-th packet is recorded as $t_k^s$ (Step 208), the values of k and $t_k^s$ are encapsulated in the k-th packet (Step 210), and the k-th packet is then sent (Step 212). The method then returns to Step 204 to await the next packet ready to be sent. The method 200 can continue indefinitely, such as long as packets are awaiting transmission from the source node 102s. One example implementation is further described in Algorithm 1.

---
Algorithm 1: Sending Packets At the Source.
---
1   $k \leftarrow 0$;   $t_k^s \leftarrow 0$;
2   while forever do
3   |   wait until a packet is ready;
4   |   $k \leftarrow k + 1$;
5   |   record in $t_k^s$ the current local time;
6   |   encapsulate k and $t_k^s$ in the packet and send the
     |_ packet out to the sink;

---

The method 200 illustrated in FIG. 6 and described herein is provided merely by way of example and not limitation. Additional steps not specifically described can be included in further embodiments, and alternate embodiments are also possible. Moreover, although the method 200 is described as being implemented at the source side, it should be understood that a variety of implementations are possible, as discussed above with respect to FIG. 3. Additionally, it should be noted that the method 200 can be implemented on any node 102 in the network 100, depending on the particular path P for which an estimate or calibration action is desired.

Figure 7:
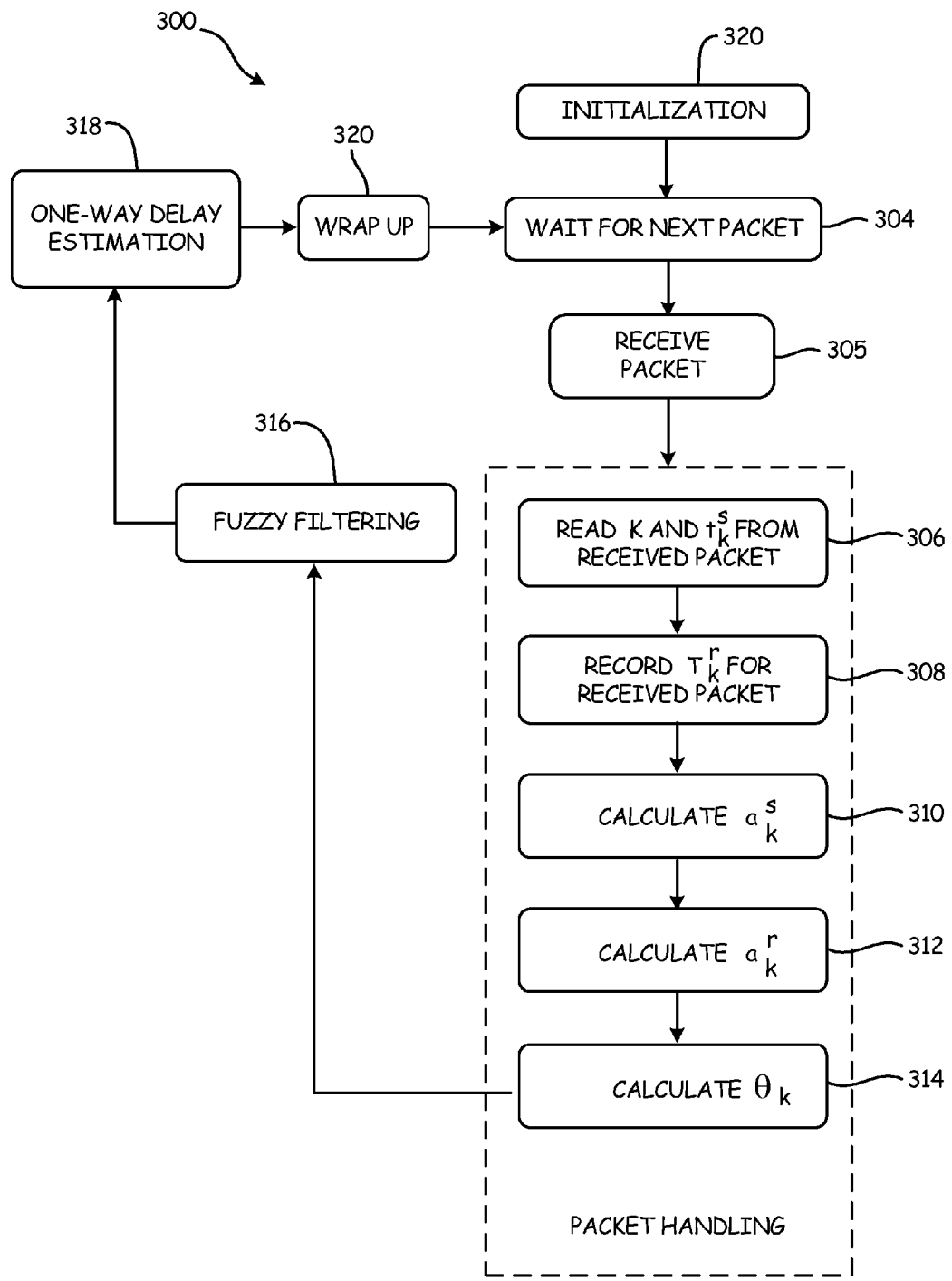
FIG. 7 is a flow chart illustrating an embodiment of a method for sink-side packet handling and parameter estimation utilizing a ratio of packet inter-arrival time according to the present invention.

FIG. 7 is a flow chart illustrating an embodiment of a method 300 for sink-side packet handling and parameter estimation utilizing a ratio of packet inter-arrival time. The method 300 can be performed in conjunction with the method 200, or in conjunction with other methods, as desired for particular applications. In a first step of the method 300, an initialization procedure is performed for a given packet stream received from the one-way path P between the source node 102s and the sink node 102r in the network 100 (Step 302). Initialization can include setting initial values (e.g., zero) of selected data values, such as $k' \leftarrow 0$, $t_{k'}^s \leftarrow 0$, $T_k^r \leftarrow 0$ and $\theta_{k'} \leftarrow 0$. In this notation, k' designates the previously received packet (i.e., a prior adjacent packet in the received packet stream, regardless of whether or not those packets are received in order, that is, regardless of whether the values satisfy k>k'). Initialization can further include setting initial values for fuzzy filtering modes (which are explained further below), such as $\rho^{high} \leftarrow 2.0$, $\rho^{mid} \leftarrow 1.0$, and $\rho^{low} \leftarrow 0.5$. The particular initial values for $\rho^{high}$ and $\rho^{low}$ can vary as desired for particular applications, and can be selected as a function of characteristics of the network 100, such as hardware tolerances, etc. For instance, in further embodiments, $\rho^{high}$ can be any value greater than 1.0 and approaching infinity, such as, 1.1, 1.25, 1.5, 10, 100, 1,000, 10,000, etc. Moreover, in further embodiments, $\rho^{low}$ can be any value less than 1.0 and approaching zero, such as 0.75, 0.25, etc. Additionally, initialization can further include setting initial values of a clock frequency ratio estimate $\hat{\phi}_k$ and a confidence measure $j_k$, such as $\hat{\phi}_k \leftarrow 1.0$ and $n_k \leftarrow 0$.

After initialization, the sink node 102r waits for the arrival of the next packet in the packet stream (Step 304). When the next packet arrives and is fully received (Step 305), the sink node 102r undertakes a number of packet handling steps: the sink node 102r reads the packet identifier k and the time $t_k^s$ (the local time at the source node 102s when the source node 102s started to send the k-th packet) encapsulated in the packet (Step 306), a timestamp $T_k^r$ (the local time at the sink node 102r when the sink node 102r fully receives the k-th packet) is recorded (e.g., in the memory 114) for the k-th packet (Step 308), the packet inter-arrival time $a_k^s$ (the inter-arrival time between the k-th and the k' (i.e., (k−1)-th) packets measured by the local clock $C_s$ of the source node 102s, as encapsulated in the respective packets) is calculated (Step 310), the packet inter-arrival time $a_k^r$ (the inter-arrival time between the k-th and (k−1)-th packets measured by the local clock $C_r$ of the sink node 102r) is calculated (Step 312), and the estimator $\theta_k$ of the "raw" ratio of clock frequencies is calculated as a ratio of the packet inter-arrival time $a_k^r$ to the packet inter-arrival time $a_k^s$ (Step 314). The packet handling steps can all be performed by the sink node 102r, or alternatively, some packet handling steps can be performed by another node 102 in the network 100 or outside the network 100. Steps 310 to 314 require the receipt of a minimum of two packets, k and k' in order to calculate inter-arrival times.

Next, fuzzy filtering can be performed (Step 316), which generates updated, "filtered" values for the clock frequency (skew) ratio estimate $\hat{\phi}_k$ and the confidence measure $n_k$ on a per-packet basis. Fuzzy filtering is explained further below with reference to FIG. 8.

After fuzzy filtering is performed, a one-way delay (OWD) estimation can be performed (Step 318). The OWD estimate can include at least one of variable OWD, constant OWD, and total OWD. OWD estimation is explained further below with reference to FIG. 11.

Finally, a wrap-up procedure can be performed (Step 320), which can include updating values stored in memory 114 such that:

$$k' \leftarrow k; t_k^s \leftarrow t_k^s; T_{k'}^r \leftarrow T_k^r.$$

The method 300 can then return to Step 304 to wait for the arrival of the next packet. The method 300 can continue indefinitely, such as long as packets are received by the sink node 102r. In this way, the sink 102r runs an algorithm represented in FIG. 7 to estimate the ratio of clock frequencies based on the local time measurements made on the source side and on the sink side. The sink node 102r calculates raw estimates of the ratio of clock frequencies $\theta_k$ based on the local time measurements. The raw estimates $\theta_k$ are fed to a fuzzy filtering algorithm, such as that described below. The fuzzy filtering step 316 can return a filtered estimate of the ratio of clock frequencies $\hat{\phi}_k$. It can be seen that the frequency ratio estimation of the method 300 is immune to possible packet losses and the out-of-the-order transmission of packets. An example implementation of the method 300 is provided in Algorithm 2.

---

Algorithm 2: Estimating the Ratio of Clock Frequencies.

```
input:   A stream of packets received at the sink.
         (packet number starts from 1)
         Parameter ϵ and ϵ^mid.
output:  The sequences of {v_k, k ≥ 2} and {c̃_k, k ≥ 2}.
1  k' ← 0; # k' denotes the previous packet
2  t_k^s ← 0; T_k^r ← 0; θ_k ← 0 n_k ← 0;
3  φ_k ← 1.0; ρ^high ← 2.0; ρ^mid ← 1.0; ρ^low ← 0.5;
4  for every packet received do
5  |    read k and t_k^s from the packet;
6  |    record local clock time in T_k^r;
7  |
        a_k^s ← t_k^s - t_{k'}^s; a_k^r ← T_k^r - T_{k'}^r; θ_k ← a_k^r / a_k^s;

8  |    # estimate ratio of clock frequency
   |_   φ_k ← freq_ratio_estimation(a_k^s, a_k^r, ϵ, ϵ^mid);
```

---

The method 300 illustrated in FIG. 7 and described herein is provided merely by way of example and not limitation. Additional steps not specifically described can be included in further embodiments, and alternate embodiments are also possible. Moreover, although the method 300 is described as being implemented at the sink side, it should be understood that a variety of implementations are possible, as discussed above with respect to FIG. 3. Additionally, it should be noted that the method 300 can be implemented on any node 102 in the network 100, depending on the particular path P for which an estimate or calibration action is desired.

Figure 8:
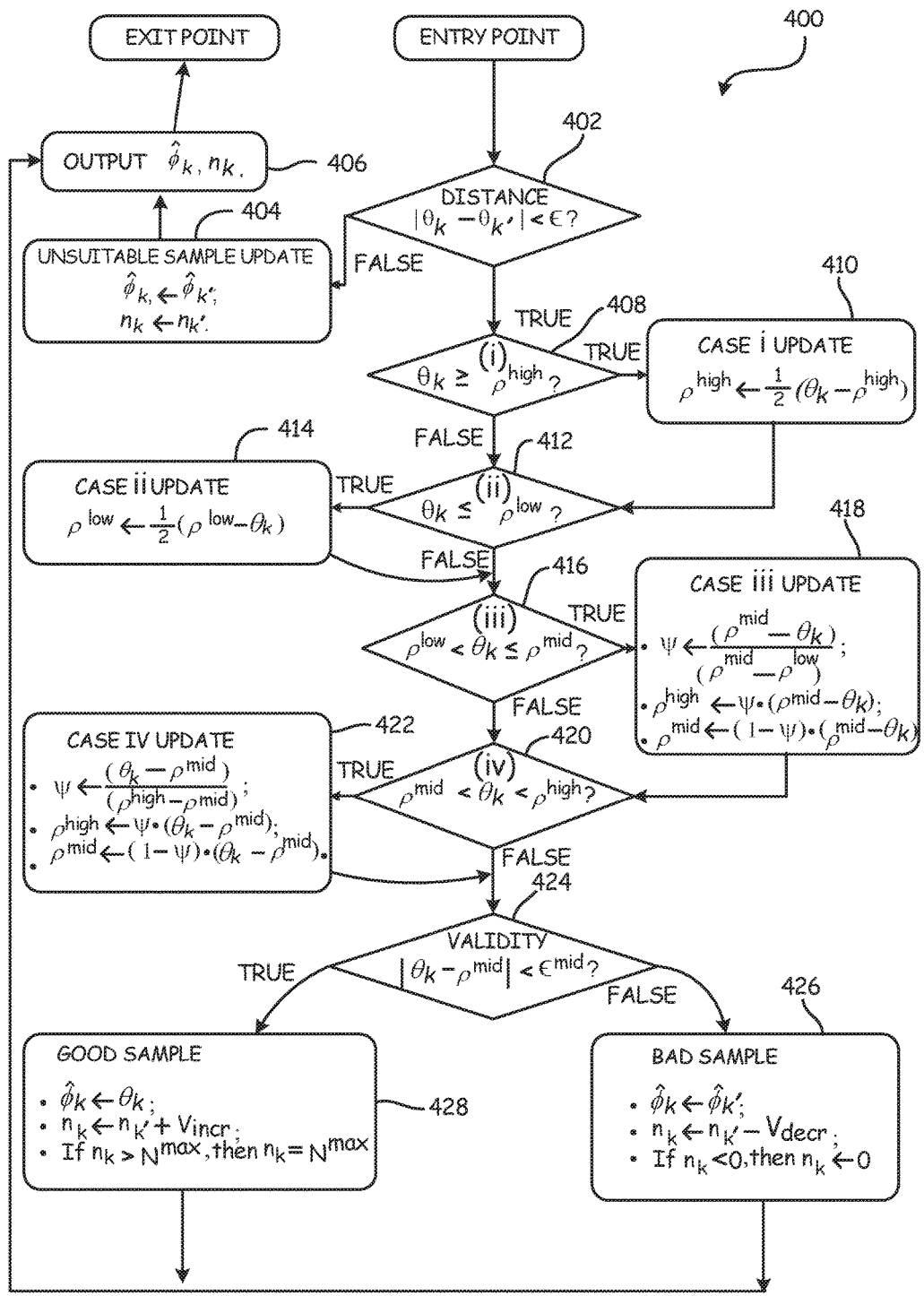
FIG. 8 is a flow chart illustrating an embodiment of a method of fuzzy filtering according to the present invention.
Figure 9:
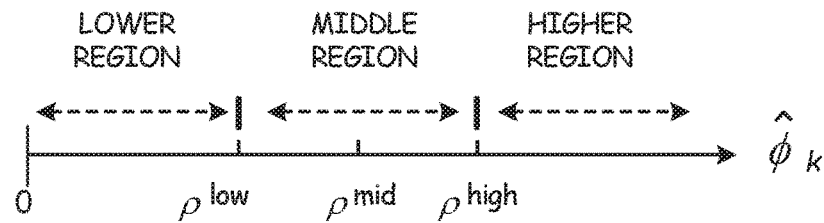
FIG. 9 is a schematic illustration of fuzzy filtering modes and regions for the method of FIG. 8.
Figure 10:
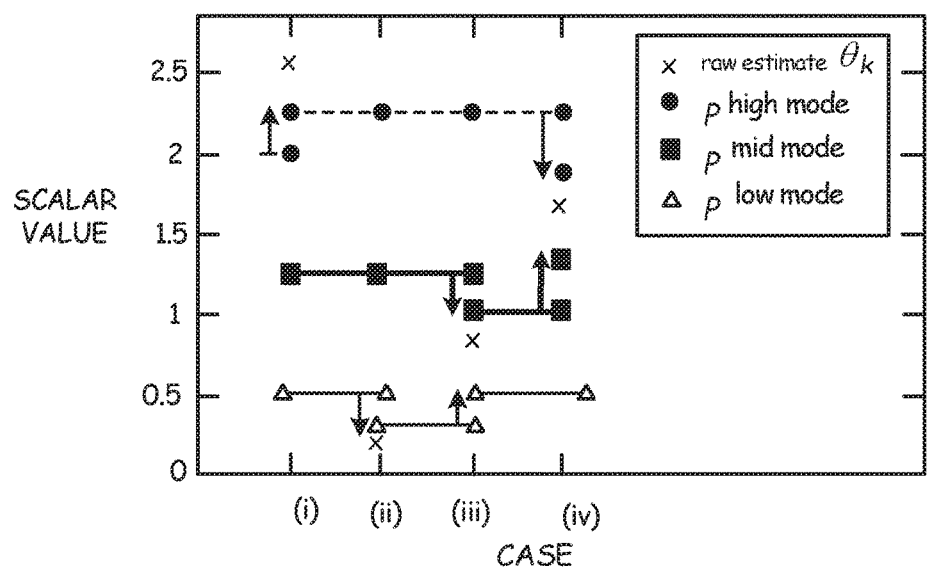
FIG. 10 is a graph illustrating iterative tracking of updates to fuzzy filtering modes in example cases.
Figure 11A:
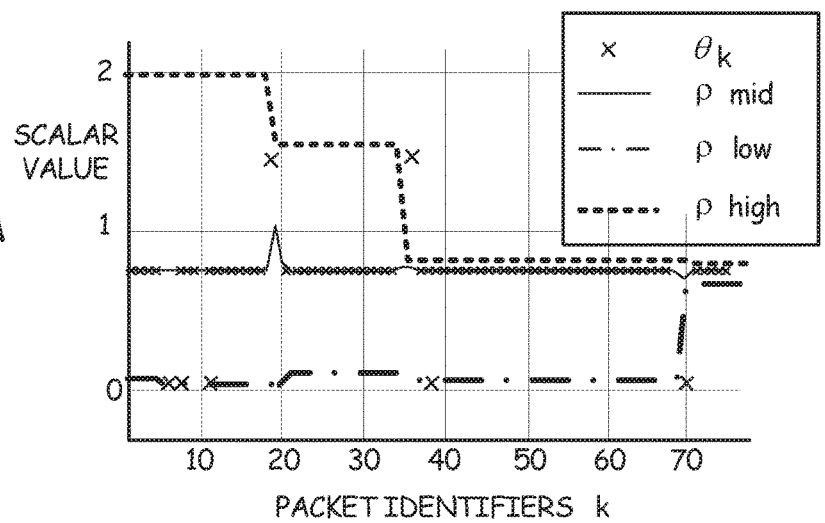
FIG. 11A is an example graph of fuzzy filtering mode tracking, illustrating scalar values vs. packet identifiers k.
Figure 11B:
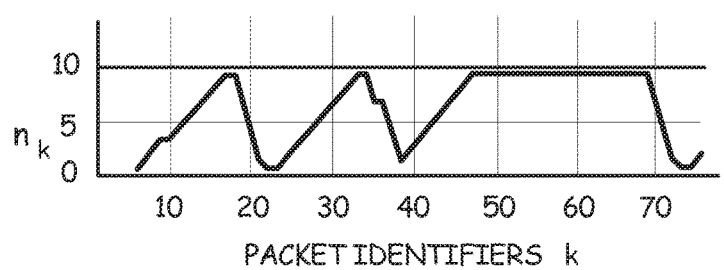
FIG. 11B is an example graph of a confidence measure for the fuzzy filtering mode tracking example of FIG. 11A.

FIG. 8 is a flow chart illustrating an embodiment of a method of fuzzy filtering 400. The method 400 can be used in conjunction with the method 300 (i.e., at Step 316), or with other methods. FIG. 9 is a schematic illustration of fuzzy filtering modes and regions for use in an embodiment of the method 400. FIG. 10 is a graph illustrating iterative tracking of updates to fuzzy filtering modes in example cases. Further, FIGS. 11A and 11B illustrate mode tracking and a corresponding confidence measure for an example packet stream. All of these figures are discussed in relation to the method 400.

In general, the fuzzy filtering method 400 allows a filtering of the values of the raw estimates of the ratio of clock frequencies $\theta_k$ before an up-to-date filtered value of the estimated ratio of clock frequencies $\hat{\phi}_k$ is provided for use in the network 100. To that end, the fuzzy filtering method 400 aims to classify the values of $\theta_k$ into multiple (e.g., three) regions, such as those shown in FIG. 9. The three regions are called higher, middle, and lower regions. For the values of $\theta_k$ that fall into the higher or lower regions, they almost surely indicate that $v_k \neq v_{k-1}$. The middle region is a fuzzy area in which suitable samples of $\theta_k$ can be found to satisfy the condition of $v_k = v_{k-1}$. The fuzzy filtering method also maintains multiple modes, which in the illustrated embodiment are a higher mode $\rho^{high}$, a middle mode $\rho^{mid}$, and a lower mode $\rho^{low}$. The higher and lower modes $\rho^{high}$ and $\rho^{low}$ form the boundaries between neighboring regions. The middle mode $\rho^{mid}$ is included within the middle region and indicates the up-to-date value of the (filtered) estimated ratio of clock frequencies $\hat{\phi}^k$. The high and low modes $\rho^{high}$ and $\rho^{low}$ are used to help limit or prevent the middle mode $\rho^{mid}$ from being updated by values of $\theta_k$ that apparently indicate cases of $v_k \neq v_{k-1}$. When the ratio of clock frequencies can change over time, the middle mode $\rho^{mid}$ can track the up-to-date value of the (filtered) estimated ratio of clock frequencies $\hat{\phi}_k$. In this way, the fuzzy filtering method 400 provides a unique and dynamic "control chart" of sorts for filtering raw estimates of a clock frequency (skew) ratio to arrive at filtered estimates of the ratios of clock frequencies that fit within a control band (i.e., the middle region) indicative of reliable estimates, with that middle region (or control band) adjusted over time on a per-packet basis.

The initial values of the three modes can be set as $\rho_{high}=2.0$, $\rho^{mid}=1.0$, and $\rho^{low}=0.5$ (e.g., at step 302 of the method 300, prior to performing the method 400), or at other values as desired for particular embodiments. A number of other parameters can be established for use in the method 400. These parameters can be set for all instances of the method 400, or can be adjusted to suit particular applications, such as being tailored to particular pathways (i.e., discrete sets of node pairs) or use-case scenarios associated with the network 100. A parameter $\epsilon$ is established as a distance measurement threshold, a parameter $\epsilon^{mid}$ is established for a validity test, a maximum confidence measure value $N^{max}$ is established, an increment value x is established, and a decrement value y is established. The parameters $\epsilon$ and $\epsilon^{mid}$ can be established based on the desired accuracy desired, with smaller values of the parameter c providing greater accuracy with the fuzzy filtering method 400, and with smaller values of the parameter $\epsilon^{mid}$ providing greater sensitivity and quality for an associated confidence measure n, described further below. In one embodiment, the parameter $\epsilon$ is $10^{-4}$ and the parameter $\epsilon^{mid}$ is 1.0 for a "good" estimate, in another embodiment, the parameter $\epsilon$ is $10^{-3}$ and the parameter $\epsilon^{mid}$ is 1.0 for an "acceptable" estimate, in another embodiment, the parameter $\epsilon$ is $10^{-2}$ and the parameter $\epsilon^{mid}$ is 1.0 for a "mediocre" estimate, and in yet another embodiment, the parameter $\epsilon$ is $10^{-1}$ and the parameter $\epsilon^{mid}$ is 1.0 for a "good" estimate. In a further embodiment, the parameter $\epsilon$ is $10^{-5}$ and the parameter $\epsilon^{mid}$ is $10^{-6}$ for a "cautious" estimate, and in yet another embodiment, the parameter $\epsilon$ is $10^{-3}$ and the parameter $\epsilon^{mid}$ is $10^{-1}$ for an "incautious" estimate. The maximum confidence measure value $N^{max}$ can be set arbitrarily, such as at a value of 10. The increment and decrement values $V_{incr}$ and $V_{decr}$ can be set in relation to the value of $N^{max}$ and desired quality or sensitivity of the confidence measure. For instance, in one embodiment, $V_{incr}$ is 10% of $N^{max}$ (i.e., 1 if $N^{max}$ is 10) and $V_{decr}$ is 30% of $N^{max}$(i.e., 3 if $N^{max}$ is 10). In some embodiments, the decrement value Vdecr is larger (e.g., three times larger) than the increment value $V_{incr}$, such that, on a per-packet basis, the fuzzy filtering method 400 decreases the confidence measure nk more rapidly than the method 400 increases the confidence measure $n_k$ under applicable conditions. In general, the amount of decrement $V_{decr}$ should be larger than that of the increment $V_{incr}$. The purpose of doing so is to quickly reduce the value of the quality measure $n_k$ whenever the result of the validity test $|\theta_k - \rho^{mid}| < \epsilon^{mid}$?(e.g., Step 424) is false. The increment and decrement $V_{incr}$ and $V_{decr}$ can be implemented in either an additive increment/additive decrement fashion or an additive increment/multiplicative decrement fashion. In the case of additive increment/additive decrement, the values of $V_{incr}$ and $V_{decr}$ are constant values assigned in the initialization stage. The updates on $n_k$ can be described as $$n_k \leftarrow n_k + V_{incr} \text{ and } n_k \leftarrow n_k - V_{decr} \text{ with}$$
$$1 \leq V_{incr} < V_{decr} < N^{max}$$

In the case of additive increment/multiplicative decrement, the value of $V_{incr}$ is a constant value assigned in the initialization stage, and the value of $V_{decr}$ is calculated from $n_{k'}$ by $V_{decr} \leftarrow \rho \cdot n_{k'}$ with $\rho$ being a constant value (between 0 and 1) assigned in the initialization stage. The value of $\rho$ represents the degradation on the quality measure $n_k$. The updates on $n_k$ can be described as $$n_k \leftarrow n_k + V_{incr} \text{ with } 1 \leq V_{incr} < N^{max} \text{ and } n_k \leftarrow n_k - V_{decr},$$
$$V_{decr} \leftarrow \rho \cdot n_k, (0 < \rho < 1)$$

It should be noted that the particular values of the parameters $\epsilon$ and $\epsilon^{mid}$, the maximum confidence measure value $N^{max}$, and the increment and decrement values $V_{incr}$ and $V_{decr}$ enumerated herein are provided merely by way of example and not limitation. Other values can be selected as desired for particular applications.

When a given packet is received, the method 400 can begin with a distance test (Step 402). The distance test can be expressed as $|\theta_k - \theta_k| < \epsilon$. If the distance test fails for the given packet, that is, the result is false, an unsuitable sample update can be performed (Step 404) and an output generated (Step 406). If the distance test succeeds for the packet, that is, the result is true, then a number of case tests can be performed and associated case updates. In the illustrated embodiment, the three modes $\rho^{high}$, $\rho^{low}$ and $\rho^{mid}$ can be updated in four cases (i) to (iv). A case (i) test (Step 408) can produce a case (i) update of the high mode $\rho^{high}$ for true results (Step 410), a case (ii) test (Step 412) can produce a case (ii) update of the low mode $\rho^{low}$ for true results (Step 414), a case (iii) test (Step 416) can produce a case (iii) update for the high mode $\rho^{high}$ and the middle mode $\rho^{low}$ for true results (Step 418), and a case (iv) test (Step 420) can produce a case (iv) update for the high mode $\rho^{high}$ and the middle mode $\rho^{mid}$ for true results (Step 422). In the illustrated embodiment, for false results for any of the case (i) to (iii) tests and for performance of any of the case (i) to (iii) updates, the method 400 proceeds to the next case test (ii) to (iv), that is, Steps 408 or 410 to Step 412, Steps 412 or 414 to Step 416, and Steps 416 or 418 to Step 420. The various case tests (i) to (iv) of Steps 408, 412, 416 and 420 can be performed sequentially as illustrated in FIG. 8, or alternatively some or all tests can be performed concurrently or in a different order in further embodiments. In general, the case (i) and (ii) tests at Steps 408 and 412 are used to filter out and follow a trend of outliers of ° k. The case (iii) and (iv) tests of Steps 416 and 420 are used to update the middle range (as bounded by the high mode $\rho^{high}$ and the low mode $\rho^{low}$ as shown in FIG. 9) and the middle mode $\rho^{mid}$.

The following are possible embodiments of the case tests and updates. The case (i) test can be expressed as $\theta_k \geq \rho^{high}$? and the case (i) update can be $\rho^{high} \leftarrow \frac{1}{2} \cdot (\theta_k - \rho^{high})$. The case (ii) test can be expressed as $\theta_k \leq \rho^{low}$? and the case (ii) update can be $\rho^{low} \leftarrow \frac{1}{2} \cdot (\rho^{low} - \theta_k)$. The case (iii) test can be expressed as $\rho^{low} < \theta_k \leq \rho^{mid}$? and the case (iii) update can be $$\psi \leftarrow \frac{(\rho^{mid} - \theta_k)}{(\rho^{mid} - \rho^{low})}; \rho^{high} \leftarrow \psi \cdot (\rho^{mid} - \theta_k);$$
$$\rho^{mid} \leftarrow (1 - \psi) \cdot (\rho^{mid} - \theta_k).$$

The case (iv) test can be expressed as $\rho^{mid} < \theta_k < \rho^{high}$? and the case (iv) update can be $$\psi \leftarrow \frac{(\theta_k - \rho^{mid})}{(\rho^{high} - \rho^{mid})}; \rho^{high} \leftarrow \psi \cdot (\theta_k - \rho^{mid});$$
$$\rho^{mid} \leftarrow (1 - \psi) \cdot (\theta_k - \rho^{mid}).$$

It should be noted that the particular embodiments of tests and updates described herein are provided merely by way of example and not limitation. Other tests and/or updates can be devised for further embodiments.

FIG. 10 illustrates example updates of the modes $\rho^{high}$, $\rho^{low}$ and $\rho^{mid}$ for the four cases (i) to (iv). As illustrated in FIG. 10, the middle mode $\rho^{mid}$ is already at a scalar value of 1.25, meaning either iterations of the method 400 have already been performed to change that value from an initial value of 1.0, or the initial value was set to 1.25. In case (i), a value of $\theta_k$ of 2.5 that is higher than the current value 2.0 of the high mode $\rho^{high}$ produces an upward adjustment of the high mode $\rho^{high}$ to 2.25. In case (ii), a value of $\theta_k$ of approximately 0.1 that is lower than the current value 0.5 of the low mode $\rho^{low}$ produces a downward adjustment of the low mode $\rho^{low}$ to 2.25.

Turning again to the method 400 as illustrated in FIG. 8, after the case (i) through (iv) tests are performed, a validity test is performed (Step 424). Performing the validity test after at least the case (iii) and (iv) tests at Steps 416 and 420 allows the validity test to utilize an up-to-date value of the middle mode $\rho^{mid}$. In general, the validity test structures the method 400 such that the modes $\rho^{high}$, $\rho^{low}$ and $\rho^{mid}$ are only updated based on the similar values of consecutive ratios $\theta_k$, in relation to the parameter $\epsilon^{mid}$, i.e., $|\theta_k - \rho^{mid}| \epsilon^{mid}$. A false result of the validity test at Step 412 produces a bad sample action (Step 426), whereas a true result of the validity test at Step 412 produces a good sample action (Step 428). In the illustrated embodiment, the bad sample action includes $\hat{\phi}_k \leftarrow \hat{\phi}_k$, $n_k \leftarrow n_k - y$; and if $n_k < 0$ then $n_k \leftarrow 0$. Moreover, in the illustrated embodiment the good sample action includes $\hat{\phi}_k \leftarrow \theta_k$, $n_k \leftarrow n_k + x$; and if $n_k > N^{max}$ then $n_k = N^{max}$. As a result of a given iteration of the fuzzy filtering method 400, when the good sample action is taken at step 428, the "raw" value of $\theta_k$ is treated as the estimated ratio of clock frequencies $\hat{\phi}_k$ when the "raw" value of $\theta_k$ stays in a close neighborhood of the middle mode $\rho^{mid}$, i.e., $|\theta_k - \rho^{mid}| < \epsilon^{mid}$. Otherwise, when the bad sample action is taken at Step 426 or an unsuitable sample update is performed at Step 404, the "raw" value of $\theta_k$ is discarded for that iteration of the method 400 and the prior estimated ratio of clock frequencies $\hat{\phi}_k$ is maintained at least until the next iteration of the method 400 when another packet arrives at the sink node 102r (e.g., in the method 300).

After the unsuitable sample update at Step 404, the bad sample update at Step 426, or the good sample update at Step 428, the output update can be performed at Step 406. The output step can include writing to the memory 114, or other desired action. In a typical embodiment, the output step will involve outputting updated (i.e., up-to-date) values of the filtered estimated ratio of clock frequencies 4 and a confidence measure $n_k$ as determined by the given iteration of the fuzzy filtering method 400. Those values can be used in conjunction with other methods, such as the method 300 described above.

A quality measure of any given (filtered) estimated ratio of clock frequencies $\hat{\phi}_k$ is provided by a corresponding value of the confidence measure $n_k$. In the illustrated embodiment, the value of $n_k$ goes between 0 (denoting a poor estimation) and $N^{max}$ (e.g., $N^{max}=10$) (denoting a very good estimation). The value of $n_k$ can be increased by x (e.g., x=1) when a value of $\theta_k$ falls in the close neighborhood of the middle mode $\rho^{mid}$, and can be decreased by y (e.g., y=3) when falling outside the close neighborhood. It can be seen that the high and low modes $\rho^{high}$, $\rho^{low}$ can prevent the extreme values of $\theta_k$ from updating the value of the middle mode $\rho^{mid}$. Meanwhile, the confidence measure $n_k$ can also offer a numeric measure of a confidence that the estimated value of the ratio of clock frequencies $\hat{\phi}_k$ (and/or $\theta_k$) is similar to the "true" ratio of clock frequencies $\hat{\phi}_k$. The ratio of clock frequencies can change over time, and the middle mode $\rho^{mid}$ can track the up-to-date value the filtered estimated ratio of clock frequencies $\hat{\phi}_k$.

An example of mode tracking driven by empirical samples of $\theta_k$ obtained in a numerical validation of the method 400 is shown in FIGS. 11A and 11B. FIG. 11A illustrates example scalar values of the modes $\rho^{high}$, $\rho^{low}$ and $\rho^{mid}$ and samples of the estimated ratio of clock frequencies $\theta_k$ on a vertical axis versus packet identifiers k on the horizontal axis. FIG. 11B illustrates example values of $n_k$ on the vertical axis versus packet versus packet identifiers k on the horizontal axis, for the same example as in FIG. 11A. The horizontal axes of the packet identifiers k are aligned between FIGS. 11A and 11B. It can be seen that sequences of values of $\theta_k$ close to the middle mode $\rho^{mid}$ in FIG. 11A tend to increase the values of the confidence measure $n_k$ to $N^{max}$ in FIG. 11B, whereas values of $\theta_k$ for packets k=19, 25, 26 and 70 contribute to sharp decreases in the values of the confidence measure $n_k$ toward zero, and in some cases reaching zero, as shown in FIG. 11B.

An example implementation of the fuzzy filtering method 400 is shown in Algorithm 3.

The method 400 illustrated in FIG. 8 and described herein is provided merely by way of example and not limitation. Additional steps not specifically described can be included in further embodiments, and alternate embodiments are also possible. Moreover, although the method 400 is described as being implemented at the sink side, it should be understood that a variety of implementations are possible, as discussed above with respect to FIG. 3. Additionally, it should be noted that the method 400 can be implemented on any node 102 in the network 100, depending on the particular path P for which an estimate or calibration action is desired. Likewise, the examples illustrated in FIGS. 9-11B are also provided merely by way of example and not limitation.

---

Algorithm 3: Fuzzy Filtering Subroutine.

--- input: $a_k^s$, $a_k^r$, $\epsilon$, $\epsilon^{mid}$.
output: $\hat{\phi}_k$ and $n_k$.
1 if $|\theta_k - \theta_{k'}| < \epsilon$ then
2    if $\theta_k \geq \rho^{high}$ then      # case (i)
3      $\rho^{high} \leftarrow \frac{1}{2} \cdot (\theta_k - \rho^{high})$
4    if $\theta_k \leq \rho^{low}$ then      # case (ii)
5      $\rho^{low} \leftarrow \frac{1}{2} \cdot (\rho^{low} - \theta_k)$
6    if $\rho^{low} < \theta_k \leq \rho^{mid}$ then      # case (iii)
7      $\psi \leftarrow \frac{(\rho^{mid} - \theta_k)}{(\rho^{mid} - \rho^{low})}$;
8      $\rho^{high} \leftarrow \psi \cdot (\rho^{mid} - \theta_k)$;
9      $\rho^{mid} \leftarrow (1 - \psi) \cdot (\rho^{mid} - \theta_k)$;
10    if $\rho^{mid} < \theta_k < \rho^{high}$ then      # case (iv)
11      $\psi \leftarrow \frac{(\theta_k - \rho^{mid})}{(\rho^{high} - \rho^{mid})}$;
12      $\rho^{high} \leftarrow \psi \cdot (\theta_k - \rho^{mid})$;
13      $\rho^{mid} \leftarrow (1 - \psi) \cdot (\theta_k - \rho^{mid})$
14    if $|\theta_k - \rho^{mid}| < \epsilon^{mid}$ then
15      $\hat{\phi}_k \leftarrow \theta_k$; $n_k \leftarrow n_{k'} + 1$;
16      if $n_k > N^{max}$ then $n_k = N^{max}$;
17    else
18      $\hat{\phi}_k \leftarrow \hat{\phi}_{k'}$; $n_k \leftarrow n_{k'} - 3$;
19      if $n_k < 0$ then $n_k \leftarrow 0$;
20 else $\{\hat{\phi}_k \leftarrow \hat{\phi}_{k'}$; $n_k \leftarrow n_{k'}\}$;
21 $k' \leftarrow k$; $t_{k'}^s \leftarrow t_k^s$; $T_{k'}^r \leftarrow T_k^r$;

---

Estimation of the One-Way Delays

With the knowledge of the estimated ratio of clock frequencies $\hat{\phi}_k$, the variable (v) and constant (c) components of one-way delays (OWDs) on the path P can be further estimated. The estimation OWDs can be performed on a per-packet basis on the sink side. Without the knowledge of the clock frequency and relative clock offset for both the source node 102s and the sink node 102r, the estimated values of OWDs are distorted from the actual ("true") values of the OWDs. The estimated values of the one-way variable delays $\tilde{v}_k$ are distorted by a multiplicative factor which is the sink-side clock frequency. The estimated values of the one-way constant delays $\tilde{c}_k$ are distorted by the sink-side clock frequency and the relative clock offset.

Estimating the One-Way Variable Delays

It can be seen from the recursion equation given above that $v_k = v_{k-1}$ if $a_k^r = \phi(u_k^r) \cdot a_k^s$. This means that the (k −1)-th and k-th packets have experienced the same amount of cumulative variable delays along the one-way path. Among the cases that adjacent packets experience the same amount of cumulative variable delays, we treat the case that the two packets experience a zero cumulative variable delay as the common case. When $k_0(k_0<k)$ is denoted as the most recent packet before the k-th packet that yields $a_{k_0}^r = \phi(u_{k_0}^r) \cdot a_{k_0}^s$ the estimated value of cumulative variable delay for the k-th packet is expressed as $$\beta_r(\tilde{u}_r(u_k^r)) \cdot v_k = \beta_r(\tilde{u}_r(u_{k_0}^r)) \cdot v_{k_0} + \sum_{k_0 \le j \le k} [a_j^r - \phi(u_j^r) \cdot a_j^s].$$

If $v_{k_0} = 0$ is assumed, then the estimated value of the one-way cumulative variable delay can be estimated by $$\hat{v}_k = \beta_r(\tilde{u}_r(u_k^r)) \cdot v_k = \sum_{k_0 \le j \le k} [a_j^r - \phi(u_j^r) \cdot a_j^s].$$

A heuristic that $v_{k_0} = 0$ when $a_{k_0}^r = \phi(u_{k_0}^r) \cdot a_{k_0}^s$ can be assumed in the estimation. The value of $\phi(u)$ can be estimated using the local time measurements t, T, and the estimation method has been discussed above. Hence, the value of the estimated value of the one-way cumulative variable delay $\tilde{v}_k$ can be estimated based on the inter-arrival times between adjacent packets according to local clocks. $\tilde{v}_k$ is distorted from $v_k$ by a multiplicative factor of $\beta_r(\tilde{u}_r(u_k^r))$.

With the knowledge of $\beta_r(\tilde{u}_r(u_k^r))$, a recursion on the actual value of the one-way variable delays can be expressed as $$v_k = v_{k-1} + \frac{a_k^r - \phi(u_k^r) \cdot a_k^s}{\beta_r(\tilde{u}_r(u_k^r))}.$$

The one-way variable delay experienced by the k-th packet is estimated as $$\tilde{v}_k = \sum_{k_0 \le j \le k} \frac{a_j^r - \phi(u_j^r) \cdot a_j^s}{\beta_r(\tilde{u}_r(u_j^r))}.$$

The heuristic becomes that $v_{k_0} = 0$ when $a_{k_0}^r = \phi(u_{k_0}^r) \cdot a_{k_0}^s$. This assumption is the only factor that affects the accuracy of the estimation of the one-way cumulative variable delay $\tilde{v}_k$ under skew-free local clocks. The estimated value of the ratio of clock frequencies $\hat{\phi}_k$ can be used as a proxy for the "true" ratio of clock frequencies $\phi_k$.

Estimating the One-Way Constant Delay:

The constant component of one-way delay is expressed as $$c + v_k = u_k^r - u_k^s.$$

The distorted value of the one-way constant delay is estimated at the k-th packet at the sink as $$\hat{c}_k = \beta_r(\tilde{u}_r(u_k^r)) \cdot (c + \delta_k) = T_k^r - \phi(u_k^r) \cdot t_k^s - \hat{v}_k, \text{ with}$$

$$\delta_k = \frac{C_r(\tilde{u}_r(u_k^r))}{\beta_r(\tilde{u}_r(u_k^r))} - \frac{C_s(\tilde{u}_s(u_k^s))}{\beta_s(\tilde{u}_s(u_k^s))} + \tilde{u}_s(u_k^s) - \tilde{u}_r(u_k^r).$$

The value of the estimated the one-way constant delay $\hat{c}_k$ can be calculated from the local time measurements t, T and the estimated value of the ratio of clock frequency $\hat{\phi}_k$ with the estimated value of the ratio of clock frequencies $\phi_k$ used as a proxy for the "true" ratio of clock frequencies $\phi_k$. The value of $\hat{c}_k$ is distorted by both the value of $\beta_r(\tilde{u}_r(u_k^r))$ and $\delta_k$. $\delta_k$ represents the relative offset between the two local clocks $C_s$ and $C_r$.

Figure 12:
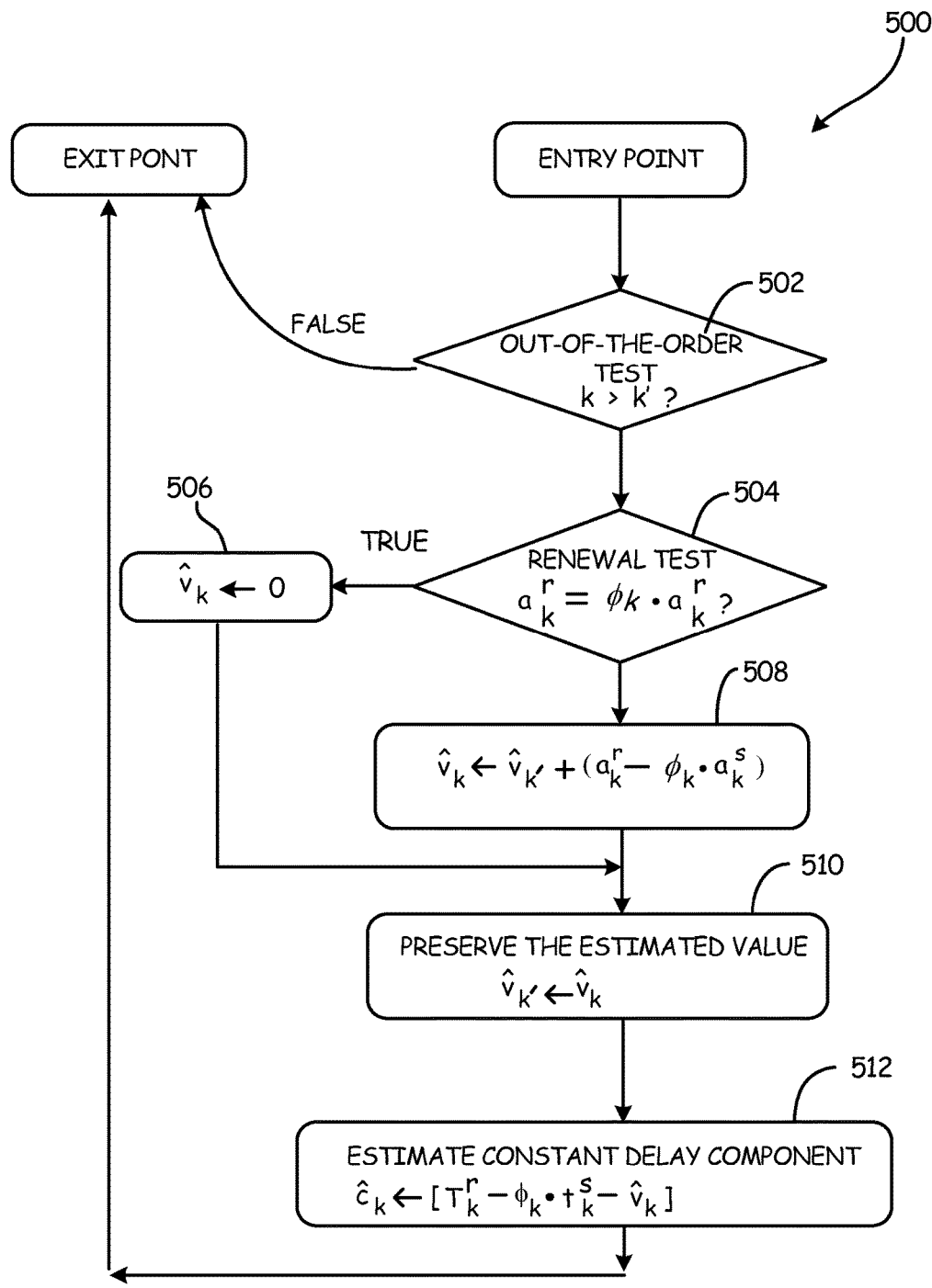
FIG. 12 is a flow chart of an embodiment of one-way delay estimation according to the present invention.

FIG. 12 is a flow chart of an embodiment of a method 500 for one-way delay estimation. The method 500 can be used in conjunction with the method 300 (i.e., at Step 318), or with other methods.

In an initial step, an out-of-the-order test is performed to determine if the received packet was sent later than the adjacent previously-received packet (Step 502). The out-of-the-order test can be expressed as k>k'? If the out-of-the-order test is false, that is, if the received packet was not received in order in relation to at least the adjacent previously-received packet, then the method 500 ends. If the out-of the-order test is true, then a renewal test can be performed (Step 504). The renewal test can be expressed as $a_k^r = \phi_k \cdot a_k^s$? If the renewal test is true, then the estimated value of the cumulative variable one-way delay can be set to a zero value: $\hat{v}_k \leftarrow 0$ (Step 506). If the renewal test is false, then the estimated value of the cumulative variable one-way delay can be calculated and set as $\hat{v}_k \leftarrow \hat{v}_k + (a_k^r - \phi_k \cdot a_k^s)$ (Step 508). Next, the estimated value of the cumulative variable one-way delay can be preserved (in memory 114) for subsequent use (Step 510), which can be expressed as $\hat{v}_{k'} \leftarrow \hat{v}_k$. Lastly, the estimated value of the cumulative constant one-way delay can be calculated and set as $\hat{c}_k \leftarrow [T_k^r - \phi_k \cdot t_k^s - \hat{v}_k]$ (Step 512). The method 500 can then end, or return to the method 300 (e.g., to Step 320).

An example embodiment of the method 500 is given in Algorithm 4, in which the freq_ratio_estimation subroutine can be implemented as the Algorithm 3.

---

Algorithm 4: Estimating the Distorted Values of vOWDs and cOWDs at the Sink.

input : A stream of packets.
        (packet number starts from 1)
output: $\{\hat{u}_k, k \ge 1\}$ and $\{\hat{c}_k, k \ge 1\}$.
1   k' ← 0; # k' denotes the previous packet
2   $t_{k'}^s \leftarrow 0$; $T_{k'}^r \leftarrow 0$; $\hat{u}_{k'} \leftarrow 0$;
3   for every packet received do
4     |   record the current local time in $T_k^r$;
5     |   read k and $t_k^s$ from the packet;
6     |   if k > k' then
7     |    |   $a_k^s \leftarrow t_k^s - t_{k'}^s$; $a_k^r \leftarrow T_k^r - T_{k'}^r$;
8     |    |   # estimate ratio of clock frequency
        |    |   $\phi_k \leftarrow$ freq_ratio_estimation($a_k^s, a_k^r$);
9     |    |   if $a_k^r = \phi_k \cdot a_k^s$ then $\hat{u}_k \leftarrow 0$;
10    |    |   else $\hat{u}_k \leftarrow \hat{u}_{k'} + (a_k^r - \phi_k; a_k^s)$;
11    |    |   $\hat{c}_k \leftarrow [T_k^r - \phi_k \cdot t_k^s - u_k]$;
12    |    |_ k' ← k; $t_{k'}^s \leftarrow t_k^s$; $T_{k'}^r \leftarrow T_k^r$; $\hat{u}_{k'} \leftarrow \hat{u}_k$;
13    |   else   # out-of-the-order transmission
14    |    |_ Ignore the packet.
       |_

---

The method 500 illustrated in FIG. 12 and described herein is provided merely by way of example and not limitation. Additional steps not specifically described can be included in further embodiments, and alternate embodiments are also possible. Certain steps of the method 500 can also be omitted as desired in particular applications. For instance, it is possible to omit steps 510 and.or 512 in alternative embodiments. Moreover, although the method 500 is described as being implemented at the sink side, it should be understood that a variety of implementations are possible, as discussed above with respect to FIG. 3. Additionally, it should be noted that the method 500 can be implemented on any node 102 in the network 100, depending on the particular path P for which an estimate or calibration action is desired.

Estimation of Relative Clock Offset

The relative clock offset between the skew-free clocks running on the pair of source and sink nodes is denoted by a constant value S which is expressed as $$\delta = C_r(u) - C_s(u) \text{ for any } u.$$

A handshake between a given pair of source and sink nodes 102s and 102r can be performed to estimate the OWDs. The handshake serves to obtain the offsetted values of the OWDs along each of the uni-directional paths between the pair of source and sink nodes 102s and 102r.

The Handshake

When it is assumed that the estimation is performed by the sink node 102r, the sink node 102r can initiate the handshake. Two packets $j_1$, $j_2$ are exchanged between the source and the sink nodes 102s and 102r in this (sink-initiated) handshake, which are labeled by $j_1$ and $j_2$ as follows.

(i) The sink node 102r sends the packet it to the source node 102s.

(ii) After receiving the packet $j_1$, the source node 102s sends the packet $j_2$ to the sink node 102r.

The sink node 102r sends packet $j_1$ to the source at a local time of $T_{j_1}^s$. When the source node 102s receives packet $j_1$ at its local time $T_{j_1}^s$ when the source node 102s immediately sends packet $j_2$ at source local time $t_{j_2}^s = t_{j_1}^r$. The sink node 102r also encapsulates a time-stamp $t_{j_2}^s$ the packet $j_2$. When the sink node 102r receives packet $j_2$ at its local time $T_{j_2}^s$, the round-trip-time (RTT) on packets $j_1$ and $j_2$ is calculated as $$R = T_{j_2}^r - T_{j_1}^s = w_{j_1} + w_{j_2},$$

The offsetted values of the OWDs are expressed as $$b_1 = w_{j_1} - \delta = t_{j_1}^r - T_{j_1}^s,$$

$$b_2 = w_{j_2} + \delta = T_{j_2}^r - t_{j_2}^s.$$

Figure 14A:
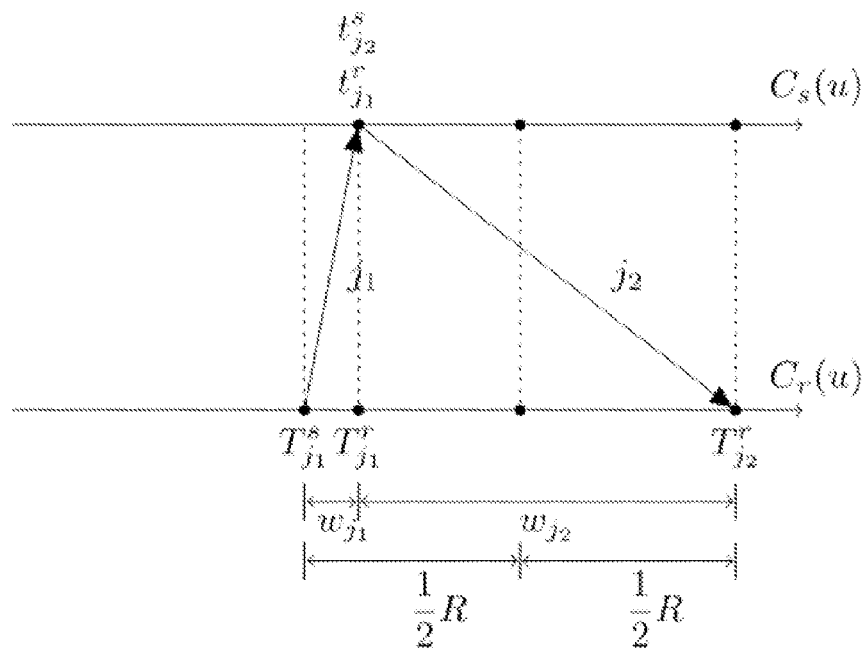
FIGS. 14A and 14B are schematic illustrations of an embodiment of packet communications for clock offset estimation.

Both values of $b_1$ and $b_2$ can be directly calculated from local time measurements. An embodiment of a sink-initiated handshake is illustrated in FIG. 14A. The values of $w_{j_1}$, $w_{j_2}$, $\delta$ are inter-related. If any of the three values is determined, then the remaining ones are determined accordingly. The difficulty of determining these values lies in the asymmetry of and wit. The following are defined to characterize the asymmetry.

$$d_1 = \frac{1}{2}(w_{j_2} - w_{j_1}) \text{ and } d_2 = w_{j_1} - d_1.$$

Both $d_1$ and $d_2$ cannot be directly calculated from local time measurements. Meanwhile, the values of $d_1 + \delta$ and $\frac{1}{2}d_2 - \delta$ can be directly calculated from local time measurements as follows.

$$b_3 = d_1 + \delta = \frac{1}{2}[T_{j_1}^s + T_{j_2}^r] - t_{j_1}^r,$$

$$b_4 = \frac{1}{2}d_2 - \delta = 2 \cdot t_{j_1}^r - \frac{3 \cdot T_{j_1}^s + T_{j_2}^r}{2}.$$

Towards Symmetric One-Way Delays

Figure 14B:
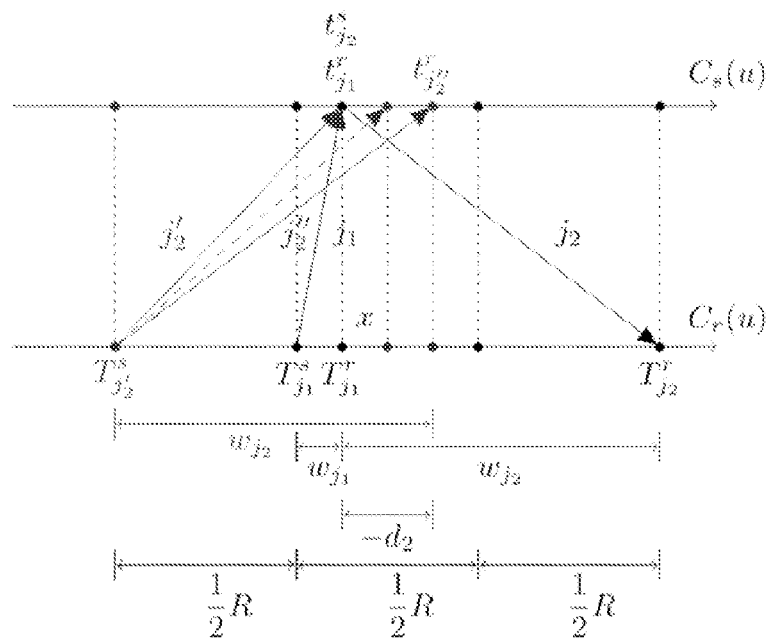

The value of $w_{j_2}$ can be determined through constructing the symmetric OWDs on the two uni-directional paths (e.g., path P and its reverse) between the source and the sink nodes 102s and 102r. A process of constructing symmetric OWDs is illustrated in FIG. 14B.

First, a new time-stamp is defined as $T_{j'_2}^s = T_{j_1}^s - \frac{1}{2}R$. Second, an imaginary packet, denoted by $j'_2$, is assumed to leave the sink at local time $T_{j'_2}^s$ and to arrive at the source at $t_{j_1}^r$. The offsetted OWD of packet $j'_2$ can be calculated as $$t_{j_1}^r - T_{j'_2}^s = (t_{j_1}^r - T_{j_1}^s) + \frac{1}{2}R = (w_{j_1} - \delta) + \frac{1}{2}R = (w_{j_2} + d_2) - \delta.$$

Third, the imaginary packet $j'_2$ is turned into another imaginary packet, denoted by $j''_2$, such that the packets $j_2$ and $j''_2$ share the same OWD $w_{j_2}$. When packet $j''_2$ is assumed to leave the sink at local time $T_{j'_2}^s$ and to arrive at the source at $t_{j''_2}^r$, the offsetted OWD of packet $j''_2$ is expressed as $w_{j_2} - \delta = t_{j''_2}^r - T_{j'_2}^s \cdot w_{j_2}$ and $\delta$ can be calculated as $$w_{j_2} = \frac{1}{2}[(t_{j''_2}^r - T_{j'_2}^s) + (T_{j_2}^r - t_{j_2}^s)],$$

$$\delta = \frac{1}{2}[(T_{j_2}^r - t_{j_2}^s) - (t_{j''_2}^r - T_{j'_2}^s)].$$

Consequently, the value of $w_{j_1}$ can also be obtained.

The Quadratic Equations $w_{j_1}$, $w_{j_2}$, and $\delta$ are approximated, respectively, by $$\hat{w}_{j_1}(x) = \frac{1}{4}R + \frac{1}{2}x,$$

$$\hat{w}_{j_2}(x) = (w_{j_2} + \frac{1}{2}d_2) - \frac{1}{2}x = \frac{3}{4}R - \frac{1}{2}x,$$

$$\hat{\delta}(x) = \delta - \frac{1}{2}(d_2 - x) = \frac{1}{2}x - b_4.$$

Quadratic Function 1:

$$\begin{cases} P'_2(x, z) = P_1(x) + \frac{1}{2}(x - z)(w_{j_1} - \delta), & (1a) \\ Q'_2(x, z) = P'_2(x, z) - \hat{w}_{j_1}(x) \cdot \hat{w}_{j_2}(x), & (1b) \\ y^2 - R \cdot y = Q'_2(x, z). & (1c) \end{cases}$$

where z is an auxiliary variable used to denote an approximated value of $d_2$.

Quadratic Function 2:

$$\begin{cases} P'_1(x, z) = P_1(x) + \frac{1}{2}(z - d_2)(w_{j_1} - \delta), & (2a) \\ Q'_1(x, z) = P'_1(x, z) - \hat{w}_{j_1}(x) \cdot \hat{w}_{j_2}(x), & (2b) \\ y^2 - R \cdot y = Q'_1(x, z). & (2c) \end{cases}$$

Variables x and z are independent to each other, and z is used as an auxiliary variable. The quadratic functions can be used to develop the estimation method for finding the value of $d_2$. The speculated value of $d_2$ is denoted by z. At a given value of z, the approximated value of $\delta$ is denoted by $\hat{\delta}(z)$ which can be calculated by making use of Quadratic Function 1 and Quadratic Function 2.

The Estimation Method

An estimation method can be developed through analyzing the quadratic functions. A set of useful values can be defined as follows.

$$b_5 = \frac{1}{2}R + \frac{3}{2}b_1, b_6 = R + 2 \cdot b_4, b_7 = \frac{1}{2}R + d_2 - \delta - \frac{1}{4}b_1.$$

At a given value of z, the value of $\delta$ is approximated by $\hat{\delta}(z) = \delta + \frac{1}{2}(z - d_2)$. The interaction points of the curves of Quadratic Function 1 and Quadratic Function 2 at a given value of z* can also be considered. The interaction point at a given value of z* is denoted by (x(z*), y(z*)). The value of y(z*) satisfies $$[y(z^*) - \frac{1}{2}R]^2 = \frac{1}{4}[R^2 + 4 \cdot \lambda(z^*)] = [(\delta + (z^* - d_2)) - \frac{1}{2}R]^2 + \frac{1}{2}[z^* - d_2] \cdot b_1.$$

When y(z*) in the above equation is required to be equal to $\hat{\delta}(z)$, we obtain the following equation:

$$[\hat{\delta}(z^*) - \frac{1}{2}R]^2 + [\frac{1}{2}b_1 \cdot (\delta - \frac{1}{2}R) + (\frac{1}{4}b_1)^2] = [(\delta - \frac{1}{2}R) + (z^* - d_2) + \frac{1}{4}b_1]^2.$$

The left-hand-side and the right-hand-side of the above equation are, respectively, denoted by $$\eta(z) = [\hat{\delta}(z) - \frac{1}{2}R]^2 + [\frac{1}{2}a_1 \cdot (\delta - \frac{1}{2}R) + (\frac{1}{4}b_1)^2],$$

$$\xi(z^*) = [(\delta - \frac{1}{2}R) + (z^* - d_2) + \frac{1}{4}b_1]^2.$$

When z* is treated as a function in z, this function is expressed as $$z^*(z)=(\tfrac{1}{2}R+d_2-\delta-\tfrac{1}{4}b_1)\pm\sqrt{\eta(z)}$$

The function $z^*(z)$ may not be defined at every value of z.

When function $z^*(z)$ is everywhere defined, the values of $z^*(a_6)$ such that $\xi(z^*(a_6))$ attains the minimum are desired to be found. Because $z^*(z)$ is defined at every value of z in this case, the values of $z^*(a_6)$ must exist. $\eta(z)$ attains the minimum at $z=a_6$. Hence, it is found that $$\tfrac{1}{2}b_1\cdot[\tfrac{1}{2}d_2-a_4-\tfrac{1}{2}R+\tfrac{1}{8}b_1]=[z^*(b_6)-\tfrac{1}{2}b_5-\tfrac{1}{2}d_2]^2.$$

The above equation describes a non-linear relation between $z^*(b_6)$ and $d_2$. When $z^*(b_6)=b_5$ and $d_2$ can be solved from the above equation. Afterwards, the values of $\delta$, $w_{j_1}$, and $w_{j_2}$ can be calculated.

When function $z^*(z)$ is not everywhere defined, the values of $z=z_0$ such that $\eta(z_0)=0$ are desired to be found. At $z=z_0$, then $z^*(z_0)=b_7$ When $b_7$ is used in place of z, let $(x(b_7), y(b_7))$ represents the intersection point of Quadratic Functions 1 & 2 at $b_7$. It is found that $x(b_7)=b_5$ and $y(b_7)=\tfrac{1}{2}b_7-b_4=\tfrac{1}{2}z^*(z_0)-b_4$.

The point $(x(b_7), y(b_7))$ satisfies that $$[y(b_7)-\tfrac{1}{2}R]^2=[\tfrac{1}{2}b_5-\tfrac{1}{2}R-b_4]^2+\tfrac{1}{2}b_1\cdot(b_5-b_7),$$

$$[\tfrac{1}{2}z^*(z_0)-b_4-\tfrac{1}{2}R]^2=\tfrac{1}{2}b_1\cdot[b_4+\tfrac{1}{2}R-\tfrac{1}{2}d_2]-[\tfrac{1}{4}b_1]^2.$$

The above equation describes a non-linear relation between $z^*(z_0)$ and $d_2$. Hence, the above equation can be used to develop a method to estimate $d_2$. When $z^*(z_0)=b_5$, $d_2$ can be solved from the above equation. Afterwards, the values of $\delta$, $w_{j_1}$, and $w_{j_2}$ can be calculated.

Possible Uses of the Estimates

The estimates described above can be used in a variety of ways, and for a variety of purposes. Some, though certainly not all, possible practical implementations are described here.

The estimated values of the ratio of clock frequencies (the raw values $\theta_k$ and/or the filtered values $\hat{\phi}_k$) can be used by timing units (e.g., clocks C) in a computer system (e.g., of the nodes 102 of the network 100) in order to remove or otherwise compensate for the clock skew. The source node 102s (e.g., a designated single one of the plurality of nodes 102 of the network 100) can be considered as a time server whose clock is treated as a master clock for the network 100. All other clocks in a distributed system (e.g., the network 100) can be treated as slave clocks and synchronized to the master clock. The computers (e.g., nodes 102) other than the time server (e.g., the source node 102s) are treated as the clients. Each client makes the time server to send a stream of packets to itself. Namely, a stream of packets are sent from a source node (the time server) to a sink node (client). The sink node runs the algorithm to estimate the ratio of clock frequencies. The estimated ratio of clock frequencies is used by a client to calibrate the frequency of its own clock to the frequency of the master clock. The algorithm for estimating the ratio of clock frequencies can be implemented at a variety of locations in the structure of a computer system. FIG. 9 shows the possible locations at which the estimation algorithm can be implemented.

A common embodiment is the implementation of this estimation algorithm in the kernel space 110K (see FIG. 3). Accurate time services are needed in every client (e.g., every node 102 in the network 100). A slave clock used in a client has to be calibrated to run at the same frequency as a master clock. Two types of time services are commonly needed in computer systems: timing service and time-stamp service. The timing service is needed to support asynchronous operations in a given computer system. The components in the given computer system usually operate asynchronously with each other. When a component is scheduled to perform some tasks at a later time, it is activated to perform the tasks at the scheduled time through the timing service. The client needs to calibrate its clock frequency to the frequency of the master clock (e.g., the master clock of the network 100).

Figure 13:
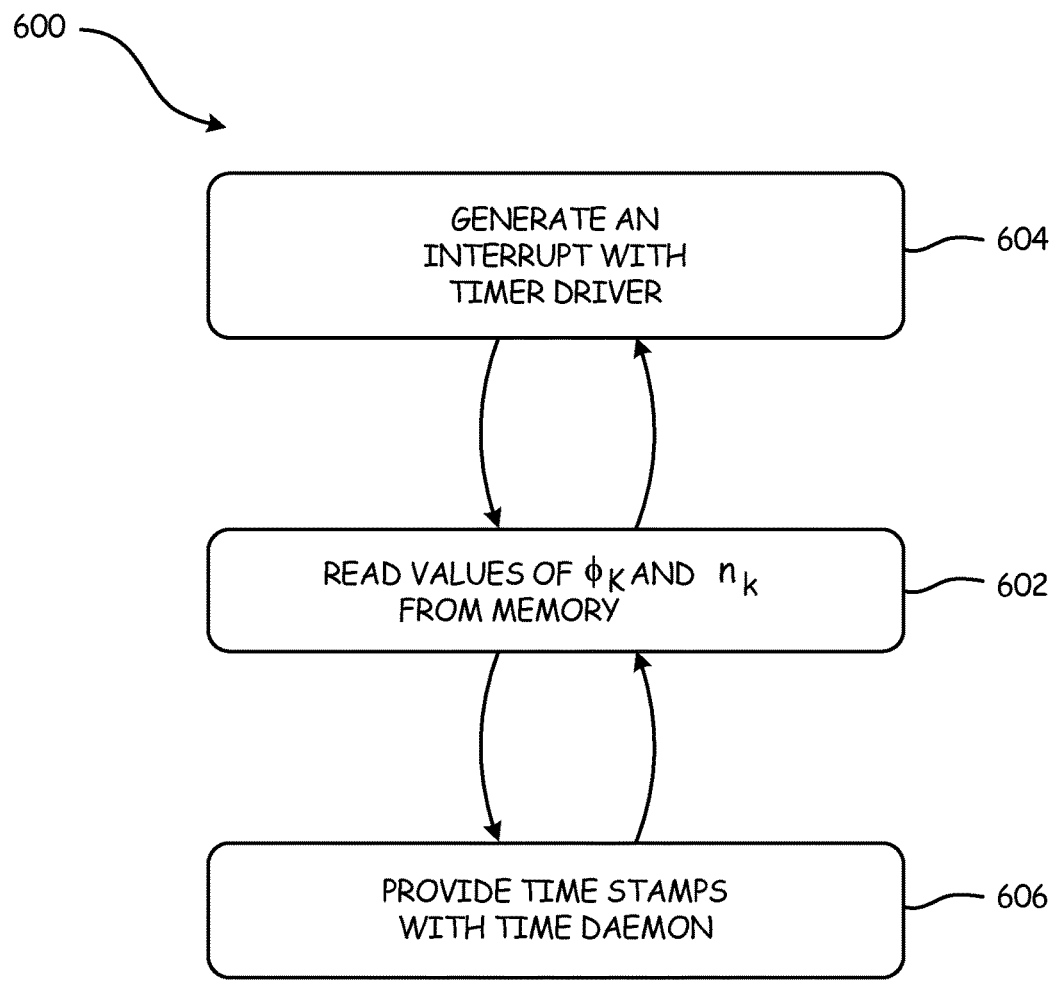
FIG. 13 is a flow chart of an embodiment of time service calibration action according to the present invention.

FIG. 13 is a flow chart of an embodiment of a method 600 for a time service calibration action. At Step 602, values of the (filtered) estimate of the ratio of clock frequencies $\hat{\phi}_k$ (in relation to a master clock) and the confidence measure $n_k$ can be read from memory (e.g., the memory 114). In an alternative embodiment, the raw estimate of the ratio of clock frequencies $\theta_k$ can be used instead of (or in addition to) the filtered value. At Step 604, a timer driver can generate and interrupt as part of a timing service upon expiration of a duration. At Step 606, a Time Daemon can provide time-stamps to any requestor (e.g., any other node 102 in the network 100, any component or application in the spaces 110U, 110K and/or 110H, etc.). Steps 604 and 606 can be performed on demand indefinitely, as desired, with Step 602 repeated to obtain current (up-to-date) values of associated estimates.

With the method 600 shown in FIG. 13, a client (e.g., a given node 102 in the network 100) can calibrate a clock frequency of its clock C by making use of the estimated values of the ratio of clock frequencies $\hat{\phi}_k$ in relation to a master clock. The time-stamp service associated with Step 606 may be needed in a computer system to keep track of time. For instance, the time-stamps recorded in different computer systems (e.g., at different nodes 102) may be required to be comparable in order to determine a causal order of event occurrence. Hence, it is necessary to calibrate the slave clocks to the master clock in order to make the time-stamps recorded in different computer systems comparable.

The method 600 illustrated in FIG. 13 and described herein is provided merely by way of example and not limitation. Additional steps not specifically described can be included in further embodiments, and alternate embodiments are also possible.

Figure 15:
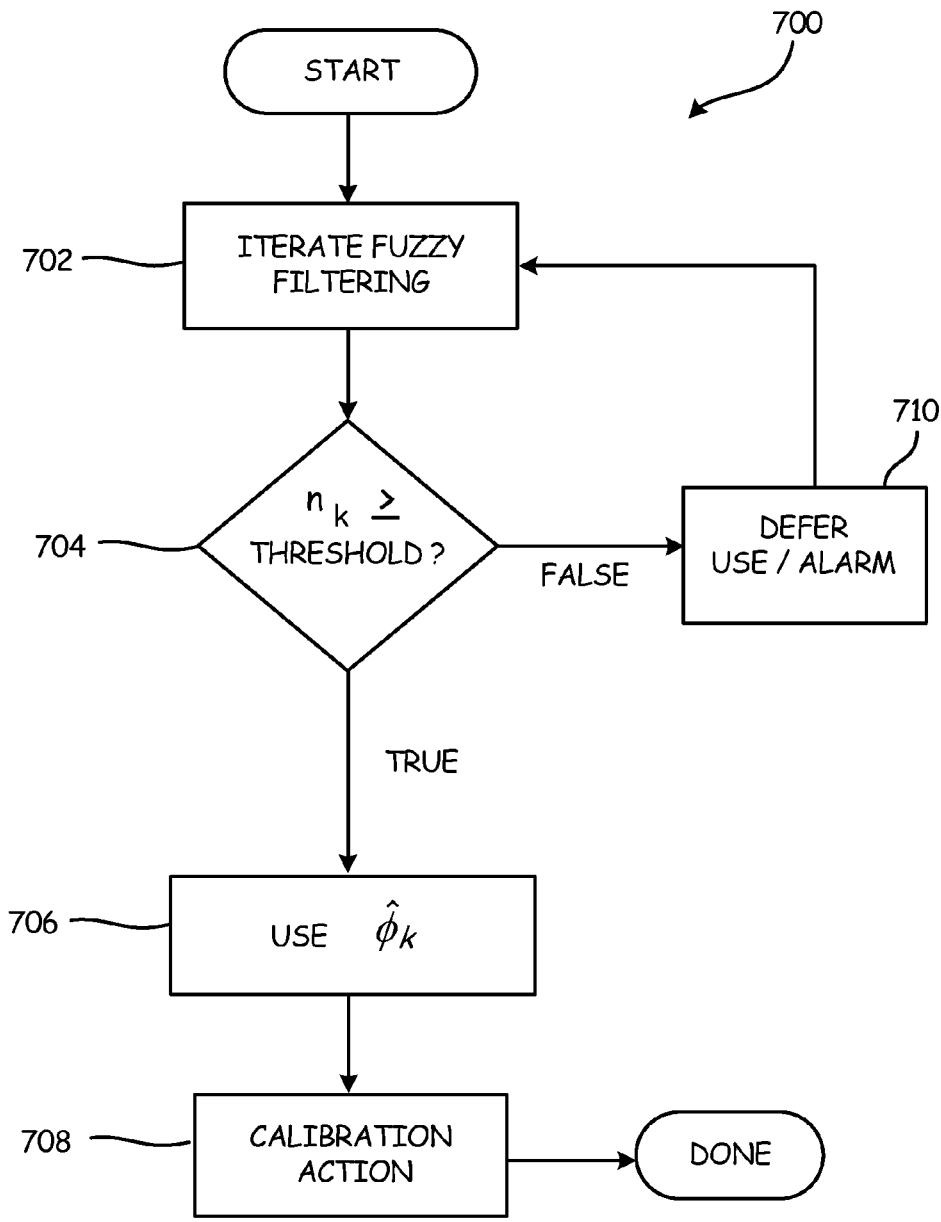
FIG. 15 is a flow chart of an embodiment of use of a confidence measure in conjunction with a calibration action according to the present invention.

FIG. 15 is a flow chart of an embodiment of a method 700 for using the confidence measure $n_k$ in conjunction with a calibration action. The method 700 can be utilized in conjunction with the method 300 described above, or any other desired method.

Initially, a fuzzy filtering method is iterated (Step 702). In one embodiment the fuzzy filtering step 702 can be implemented as the method 400 described above, or as another suitable method. The fuzzy filtering step 702 provides the estimated value of the estimated ratio of clock frequencies $\hat{\phi}_k$ and the confidence measure $n_k$. Next, a threshold test is performed to ask if the current value of the confidence measure $n_k$ is greater than or equal to a confidence threshold (Step 704). In one embodiment, the confidence threshold can be expressed as a fixed percentage of $N^{max}$, such as 100% $N^{max}$, 90% $N^{max}$, 80% $N^{max}$, 70% $N^{max}$, 60% $N^{max}$, 50% $N^{max}$, etc. The particular value of the confidence threshold will vary as a function of the value of $N^{max}$. The confidence measure $n_k$ can be used directly, like the fixed value already described, or can be used to calculate a weighted moving average, for instance: $\bar{n}_k \leftarrow (1-\pi)\cdot\bar{n}_{k-1}+\pi\cdot n_k$. $\bar{n}_k$ represents the moving average value of $n_k$ and is updated on every value of $n_k$. $\pi$ is a parameter called weight whose value is between 0 and 1. The value of π specifies the degree of reflecting the recent values of $n_k$ in $\bar{n}_k$. When π is close to 0, the recent values of $n_k$ do not largely affect the value of $\bar{n}_k$, and the value of $\bar{n}_k$ represents a long-term average of the values of $n_k$. When π is close to 1, the recent values of $n_k$ largely affect the value of $\bar{n}_k$, and the value of $\bar{n}_k$ represents a short-term average of the recent values of $n_k$. No matter $n_k$ is used directly or is indirectly, a confidence threshold should be used as a separate parameter, denoted by $n_{thresh}$. The possible values of the parameter $n_{thresh}$ are between 1 and $N^{max}$ inclusive. The decision of adopting $\hat{\phi}_k$ as the estimated clock skew is made based on the satisfaction to $n_k \geq n_{thresh}$ and $\bar{n}_k \geq n_{thresh}$ when $n_k$ and $\bar{n}_k$, respectively, are used toward the confidence measure. Moreover, the greater the value of the confidence threshold, the more stringent the method 700 will be. If the outcome is true, that is the current value of the confidence measure $n_k$ is greater than or equal to the confidence threshold, then the current value of the estimate of the ratio of clock frequencies $\hat{\phi}_k$ (associated with the current value of the confidence measure $n_k$) is deemed usable (Step 706). A calibration action can then be performed using the usable estimate of the ratio of clock frequencies $\hat{\phi}_k$ (Step 708). If the outcome of Step 704 is false, that is, the current value of the confidence measure $n_k$ is less than the confidence threshold, then use of the current value of the estimate of the ratio of clock frequencies $\hat{\phi}_k$ is deferred (Step 710). Deferral at Step 710 can optionally include the provision of an alarm indicating an unsatisfactory confidence level in the current value of the estimate of the ratio of clock frequencies $\hat{\phi}_k$.

The calibration action at Step 708 can include a variety of actions. For example, all or part of the method 600 can be invoked. The calibration action can be a synchronization between the clocks C of any two nodes 102 in the network 100, such as between master and slave clocks at different nodes 102.

The method 700 illustrated in FIG. 15 and described herein is provided merely by way of example and not limitation. Additional steps not specifically described can be included in further embodiments, and alternate embodiments are also possible.

Description of Possible Embodiments

The following are non-exclusive descriptions of possible embodiments of the present invention.

A method for use with a packet communication network that includes a source node and a sink node each having a respective clock, the method including: receiving a plurality of packets at the sink node that were sent from the source node, wherein the plurality of packets includes a first packet and a second packet; calculating a one-way sink packet inter-arrival time between the first packet and the second packet received by the sink node according to a local sink clock time, wherein the second packet arrives at the sink node subsequent to the first packet; calculating a one-way source packet inter-arrival time between the first packet and the second packet received by the sink node according to a local source clock time as encapsulated in the first and second packets; estimating a ratio of clock skew between the source node and the sink node as a function of the one-way sink packet inter-arrival time and the one-way source packet inter-arrival time; and performing a calibration action in the network as a function of the ratio of clock skew between the source node and the sink node.

The method of the preceding paragraph can optionally include, additionally and/or alternatively, any one or more of the following features, configurations and/or additional steps:

the step of estimating a ratio of clock skew between the source node and the sink node can further include performing fuzzy filtering to iteratively adjust the ratio of clock skew as a function of subsequent packets received at the sink node; the step of performing fuzzy filtering can include removing unsuitable packets from the fuzzy filtering as a function of a change in the ratio of packet inter-arrival time based on a third packet subsequently received by the sink node; establishing starting values for an adjustable middle mode and a confidence measure; and adjusting the confidence measure as a function of proximity of the ratio of packet inter-arrival times of suitable packets to the adjustable middle mode, wherein the confidence measure is incremented when a difference between the ratio of packet inter-arrival time to the adjustable middle mode is less than a proximity threshold and otherwise is decremented;

establishing starting values for an adjustable high mode and an adjustable low mode; and updating at least one of the adjustable middle mode, the adjustable high mode and the adjustable low mode as a function of a ratio of packet inter-arrival times calculated using a third packet subsequently received by the sink node;

the step of updating at least one of the adjustable middle mode, the adjustable high mode and the adjustable low mode can include at least one of:

(i) updating the adjustable high mode to account for outlier data;

(ii) updating the adjustable low mode to account for outlier data;

(iii) updating the adjustable middle mode to reflect a current filtered estimate of the ratio of clock skew, and updating the adjustable high mode; and (iv) updating the adjustable middle mode to reflect a current filtered estimate of the ratio of clock skew;

the confidence measure can be adjustable between zero and a maximum value, and, for each iteration, the increment to the confidence measure can be smaller than the decrement to the confidence measure during the step of adjusting the confidence measure such that a single decrement has a larger effect on the confidence measure than a single increment;

deferring the synchronization action until the confidence measure is greater than or equal to a confidence threshold;

the calibration action can include synchronizing the clocks of the sink node and the source node;

the calibration action can include generating an interrupt signal upon the expiration of a duration established as a function of the estimated ratio of clock skew between the source node and the sink node;

the calibration action can include generating a time stamp as a function of the estimated ratio of clock skew between the source node and the sink node;

receiving respective data payloads in the first and second packets, wherein each data payload is configured to carry data unrelated to operational characteristics of the packet transmission network;

encapsulating the local source clock time in each of the first and second packets at the source node; and encapsulating a packet identifier in each of the first and second packets at the source node;

selecting the source node and the sink node from a set of nodes in the packet communication network, wherein the set of nodes includes at least one additional node;

the local source clock time can be a local source clock start time for initiation of transmission of a corresponding packet of the plurality of packets;

recording the local sink clock time as a local source clock receipt time for full receipt of an entire corresponding packet of the plurality of packets;

calculating one-way delay between the source node and the sink node as a function of the estimated ratio of clock skew between the source node and the sink node and an estimated clock offset;

the step of calculating one-way delay between the source node and the sink node can include performing a renewal test;

the source node can act as a master clock in the packet communication network, and the synchronization action can include a clock synchronization between the source node and an additional node of the plurality of nodes;

estimating a relative clock offset between the source node and the sink node; and/or the first packet and the second packet are received adjacent one another.

A packet communication network system includes a node configured to communicate with another node along one or more network links, wherein the node comprises: communications circuitry configured to receive a plurality of packets; means for calculating a one-way sink packet inter-arrival time between a first packet and a second packet received by the node according to a local node clock time; means for calculating a one-way source packet inter-arrival time between the first packet and the second packet received by the node according to a local source clock time as encapsulated in the first and second packets; means for estimating a ratio of clock skew between the node and the other node as a function of the one-way sink packet inter-arrival time and the one-way source packet inter-arrival time; and means for performing a synchronization action in the network as a function of the ratio of clock skew.

The system of the preceding paragraph can optionally include, additionally and/or alternatively, any one or more of the following features, configurations and/or additional components:

another node configured to communicate with the node along one or more network links.

A method for use with a packet communication network that includes a source node and a sink node each having a respective clock, the method including: receiving a plurality of packets at the sink node that were sent from the source node, wherein the plurality of packets includes a first packet and a second packet; calculating a one-way sink packet inter-arrival time between the first packet and the second packet received by the sink node according to a local sink clock time, wherein the second packet arrives at the sink node subsequent to the first packet; calculating a one-way source packet inter-arrival time between the first packet and the second packet received by the sink node according to a local source clock time as encapsulated in the first and second packets; and estimating a ratio of relative clock skew between the source node and the sink node as a function of the one-way sink packet inter-arrival time and the one-way source packet inter-arrival time.

Summation

TABLE 1 lists symbols used in the present disclosure is provided for reference purposes. TABLE 1 is not a comprehensive listing of symbols used in this disclosure.

TABLE 1

| Notation | Description of Notation |
| --- | --- |
| $\tau$ | one-way cumulative propagation delay along a path used by a data stream. |
| g | one-way cumulative transmission delay for packets of equal size. |
| $f_k$ | cumulative processing delay for the k-th packet. |
| $f^{min}$ | minimum cumulative processing delay. |
| $q_k$ | cumulative queuing delay experienced by the k-th packet. |
| $w_k$ | one-way delay for the k-th packet. |
| c | constant component of $w_k$. |
| $v_k$ | variable component of $w_k$. |
| $\beta_s(u)$ | frequency of the local clock at the source node at "true" time u. |
| $\beta_r(u)$ | frequency of the local clock at the sink node at "true" time u. |
| $\varphi(u)$ | ratio of clock frequency between the sink and source nodes at "true" time u. |
| $u_k^s$ | "true" (universal) time when the source node starts to send the k-th packet. |
| $t_k^s$ | local time when the source node starts to send the k-th packet. |
| $u_k^r$ | "true" time when the k-th packet is fully received at the sink node. |
| $T_k^r$ | local time when the k-th packet is fully received at the sink node. |
| $a_k^s$ | inter-arrival time between the k-th and the (k − 1)-th packets at the source node. |
| $a_k^r$ | inter-arrival time between the k-th and the (k − 1)-th packets at the sink node. |
| $\theta_k$ | "raw" ratio of inter-durations for the k-th packet between the sink and source nodes. |
| $\rho^{low}$ | value of the lower mode. |
| $\rho^{mid}$ | value of the middle mode. |
| $\rho^{high}$ | value of the higher mode. |
| $\varepsilon$ | parameter for deciding similarity of the values of consecutive values of $\theta_k$. |
| $\varepsilon^{mid}$ | parameter for deciding similarity of $\theta_k$ to the mid mode $\rho^{mid}$. |
| $\hat{\varphi}_k$ | "filtered" ratio of clock frequency between the sink and source nodes estimated at the k-th packet. |
| $n_k$ | confidence measure of treating the value of $\hat{\varphi}_k$ (and/or $\theta_k$) as the estimated ratio of clock frequency. |
| $N^{max}$ | maximum value allowed for $n_k$. |
| $\hat{v}$ | distorted value of variable one-way delay for the k-th packet. |
| $\tilde{c}_k$ | distorted value of constant one-way delay for the k-th packet. |
| $w_{j1}$ | one-way delay experienced by packet $j_1$. |
| $w_{j2}$ | one-way delay experienced by packet $j_2$. |
| $T_{j1}^s$ | local time when the sink node starts to send packet $j_1$. |
| $t_{j1}^r$ | local time when the source node fully receives packet $j_1$. |
| $t_{j2}^s$ | local time when the source node starts to send packet $j_2$. |
| $T_{j2}^r$ | local time when packet $j_2$ fully arrives at the sink node. |

Numerous advantages and benefits of the present invention will be understood in view of the entirety of the present disclosure, including the accompanying figures. For example, the present invention permits estimates of clock skew, network delay, and the like to catch up to changes in a communication network over time, and does not assume skew between two clocks in the network to be constant. The provision of a confidence measure also provides a way to assess when an estimate of clock skew or the like is no longer sufficiently reliable.

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, transitory signal fluctuations, and the like.

Although the present invention has been described with reference to preferred embodiments, workers skilled in the art will recognize that changes may be made in form and detail without departing from the spirit and scope of the invention.

The invention claimed is:

1. A method for use with a packet communication network that includes a source node and a sink node each having a respective clock, the method comprising:
   receiving a plurality of packets at the sink node that were sent from the source node, wherein the plurality of packets includes a first packet and a second packet;
   calculating a one-way sink packet inter-arrival time between the first packet and the second packet received by the sink node according to a local sink clock time, wherein the second packet arrives at the sink node subsequent to the first packet;
   calculating a one-way source packet inter-arrival time between the first packet and the second packet received by the sink node according to a local source clock time as encapsulated in the first and second packets;
   dynamically estimating a ratio of clock frequencies between the source node and the sink node by dynamically updating boundaries of three modes based on the one-way sink packet inter-arrival time and the one-way source packet inter-arrival time, wherein an adjustable middle mode of the three modes is indicative of where an up-to-date estimate of the ratio of clock frequencies should reside; and
   performing a calibration action in the network as a function of the ratio of clock frequencies between the source node and the sink node.

2. The method of claim 1, the step of dynamically estimating a ratio of clock frequencies between the source node and the sink node further comprising:
   performing fuzzy filtering to iteratively adjust the ratio of clock frequencies and the three modes as a function of subsequent packets received at the sink node.

3. The method of claim 2, wherein the step of performing fuzzy filtering comprises:
   removing unsuitable packets from the fuzzy filtering as a function of a change in the ratio of packet inter-arrival time based on a third packet subsequently received by the sink node;
   establishing starting values for the adjustable middle mode and a confidence measure; and
   adjusting the confidence measure as a function of proximity of the ratio of packet inter-arrival times of suitable packets to the adjustable middle mode, wherein the confidence measure is incremented when a difference between the ratio of packet inter-arrival time to the adjustable middle mode is less than a proximity threshold and otherwise is decremented.

4. The method of claim 3 and further comprising:
   establishing starting values for an adjustable high mode of the three modes and an adjustable low mode of the three modes; and
   updating at least one of the adjustable middle mode, the adjustable high mode and the adjustable low mode as a function of a ratio of packet inter-arrival times calculated using the third packet subsequently received by the sink node.

5. The method of claim 4, wherein the step of updating at least one of the adjustable middle mode, the adjustable high mode and the adjustable low mode comprises at least one of:
   (i) updating the adjustable high mode to account for outlier data;
   (ii) updating the adjustable low mode to account for outlier data;
   (iii) updating the adjustable middle mode to reflect a current filtered estimate of the ratio of clock frequencies, and updating the adjustable high mode; and
   (iv) updating the adjustable middle mode to reflect a current filtered estimate of the ratio of clock frequencies.

6. The method of claim 3, wherein the confidence measure is adjustable between zero and a maximum value, and wherein, for each iteration, the increment to the confidence measure is smaller than the decrement to the confidence measure during the step of adjusting the confidence measure such that a single decrement has a larger effect on the confidence measure than a single increment.

7. The method of claim 6, and further comprising:
   deferring the calibration action until the confidence measure is greater than or equal to a confidence threshold.

8. The method of claim 1, wherein the calibration action comprises synchronizing the clocks of the sink node and the source node.

9. The method of claim 1, wherein the calibration action comprises generating an interrupt signal upon the expiration of a duration established as a function of the estimated ratio of clock frequencies between the source node and the sink node.

10. The method of claim 1, wherein the calibration action comprises generating a time stamp as a function of the estimated ratio of clock frequencies between the source node and the sink node.

11. The method of claim 1 and further comprising:
    receiving respective data payloads in the first and second packets, wherein each data payload is configured to carry data unrelated to operational characteristics of the packet transmission network.

12. The method of claim 1 and further comprising:
    encapsulating the local source clock time in each of the first and second packets at the source node; and
    encapsulating a packet identifier in each of the first and second packets at the source node.

13. The method of claim 1 and further comprising:
    selecting the source node and the sink node from a set of nodes in the packet communication network, wherein the set of nodes includes at least one additional node.

14. The method of claim 1, wherein the local source clock time comprises a local source clock start time for initiation of transmission of a corresponding packet of the plurality of packets.

15. The method of claim 1 and further comprising:
    recording the local sink clock time as a local source clock receipt time for full receipt of an entire corresponding packet of the plurality of packets.

16. The method of claim 1 and further comprising:
    calculating one-way delay between the source node and the sink node as a function of the estimated ratio of clock frequencies between the source node and the sink node and an estimated clock offset.

17. The method of claim 16, wherein the step of calculating one-way delay between the source node and the sink node comprises:
    performing a renewal test.

18. The method of claim 1, wherein the source node acts as a master clock in the packet communication network, and wherein the calibration action comprises a clock synchronization between the source node and an additional node.

19. The method of claim 1 and further comprising:
estimating a relative clock offset between the source node and the sink node.

20. The method of claim 1, wherein the first packet and the second packet are received adjacent one another.

21. A packet communication network system comprising:
a node configured to communicate with another node along one or more network links, wherein the node comprises
communications circuitry configured to receive a plurality of packets; and
wherein the node is configured to:
calculate a one-way sink packet inter-arrival time between a first packet and a second packet received by the node according to a local node clock time;
calculate a one-way source packet inter-arrival time between the first packet and the second packet received by the node according to a local source clock time as encapsulated in the first and second packets;
dynamically estimate a ratio of clock frequencies between the node and the other node by dynamically updating boundaries of three modes based on the one-way sink packet inter-arrival time and the one-way source packet inter-arrival time, wherein an adjustable middle mode of the three modes is indicative of where an up-to-date estimate of the ratio of clock frequencies should reside; and
perform a synchronization action in the network as a function of the ratio of clock frequencies.

22. The packet communication network system of claim 21 and further comprising:
another node configured to communicate with the node along one or more network links.

23. A method for use with a packet communication network that includes a source node and a sink node each having a respective clock, the method comprising:
receiving a plurality of packets at the sink node that were sent from the source node, wherein the plurality of packets includes a first packet and a second packet;
calculating a one-way sink packet inter-arrival time between the first packet and the second packet received by the sink node according to a local sink clock time, wherein the second packet arrives at the sink node subsequent to the first packet;
calculating a one-way source packet inter-arrival time between the first packet and the second packet received by the sink node according to a local source clock time as encapsulated in the first and second packets; and
estimating a ratio of relative clock frequencies between the source node and the sink node by dynamically updating boundaries of three modes based on the one-way sink packet inter-arrival time and the one-way source packet inter-arrival time, wherein an adjustable middle mode of the three modes is indicative of where an up-to-date estimate of the ratio of clock frequencies should reside.

24. A method for use with a packet communication network that includes a slave node having a slave clock and a master node having a master clock, the method comprising:
performing a handshake between the slave node and the master node;
measuring a roundtrip time (R) for packet communication of the handshake at the slave node;
calculating a half of the roundtrip delay (½R) as half of the roundtrip time (R);
estimating a measure of asymmetry ($d_2$) of one-way delays of the handshake, wherein the measure of asymmetry ($d_2$) is calculated as a function of an interaction point between a first quadratic equation and a second quadratic equation;
estimating a relative clock offset ($\delta$) between the slave clock and the master clock as a function of the measure of asymmetry ($d_2$) and the half of the roundtrip delay (½R); and
performing a calibration action as a function of the relative clock offset estimation ($\delta$).

25. The method of claim 24, wherein the step of estimating the relative clock offset ($\delta$) between the slave clock and the master clock comprises:
modeling an imaginary packet transmission between the master and sink nodes to calculate a relationship between asymmetric one-way delays ($w_{j1}$, $w_{j2}$), the measure of asymmetry ($d_2$) and the roundtrip time (R) for packet communication of the handshake, wherein the relationship satisfies:

$w_{j1}+w_{j2}-d_2=3/2 \cdot R.$

* * * * *